(12) United States Patent
Ryu et al.

(10) Patent No.: US 11,314,013 B2
(45) Date of Patent: Apr. 26, 2022

(54) BACKLIGHT UNIT AND DISPLAY DEVICE HAVING THE SAME

(71) Applicant: SAMSUNG DISPLAY CO., LTD., Yongin-si (KR)

(72) Inventors: Tae Yong Ryu, Yongin-si (KR); Do Hun Kim, Yongin-si (KR); Taek Sun Shin, Yongin-si (KR); Jae Sul An, Yongin-si (KR); Byung Seo Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 31 days.

(21) Appl. No.: 16/812,523

(22) Filed: Mar. 9, 2020

(65) Prior Publication Data

US 2020/0393611 A1  Dec. 17, 2020

(30) Foreign Application Priority Data

Jun. 12, 2019  (KR) .......................... 10-2019-0069613

(51) Int. Cl.
*F21V 8/00* (2006.01)
(52) U.S. Cl.
CPC ......... *G02B 6/0076* (2013.01); *G02B 6/0036* (2013.01); *G02B 6/0041* (2013.01); *G02B 6/0055* (2013.01); *G02B 6/0061* (2013.01); *G02B 6/0068* (2013.01)
(58) Field of Classification Search
CPC .. G02B 6/0076; G02B 6/0036; G02B 6/0041; G02B 6/0055; G02B 6/0061; G02B 6/0068

USPC ....................................................... 362/97.1
See application file for complete search history.

(56) References Cited

U.S. PATENT DOCUMENTS

| | | | | |
|---|---|---|---|---|
| 2009/0303697 A1* | 12/2009 | Kim | ..................... | G02B 5/0242 |
| | | | | 362/97.2 |
| 2011/0051397 A1* | 3/2011 | Bae | ..................... | G02B 6/0073 |
| | | | | 362/97.1 |
| 2012/0081882 A1* | 4/2012 | Im | ..................... | G02F 1/133603 |
| | | | | 362/97.1 |
| 2012/0275139 A1* | 11/2012 | Chen | ..................... | G02B 6/0025 |
| | | | | 362/97.2 |

(Continued)

FOREIGN PATENT DOCUMENTS

EP  2487514 A1 *  8/2012  ........... G02B 6/0031
KR  1020110121248 A  11/2011

(Continued)

*Primary Examiner* — Andrew J Coughlin
*Assistant Examiner* — Jessica M Apenteng
(74) *Attorney, Agent, or Firm* — Cantor Colburn LLP

(57) ABSTRACT

A backlight unit includes a light source array including at least one light source which emits light and a circuit board on which the light source is disposed, and a first optical layer disposed on the light source array. The first optical layer includes a first layer which defines at least one concave portion in a bottom of the first layer, where the at least one concave portion is coupled to the light source, a second layer disposed on the first layer, the second layer guiding light incident from the first layer in one direction, a plurality of optical patterns disposed on one surface of the second layer, the plurality of optical patterns selectively emitting light passing through the one surface, and a reflective layer disposed on the bottom of the first layer.

20 Claims, 26 Drawing Sheets

(56) References Cited

U.S. PATENT DOCUMENTS

| | | | | |
|---|---|---|---|---|
| 2016/0202395 A1* | 7/2016 | Lee | ................... | G02F 1/133602 |
| | | | | 362/97.1 |
| 2017/0160456 A1* | 6/2017 | Shani | ................... | G02B 6/0068 |
| 2018/0156961 A1* | 6/2018 | Miki | ................... | G02B 6/0026 |
| 2019/0275925 A1* | 9/2019 | Chen | ................... | B60Q 1/34 |

FOREIGN PATENT DOCUMENTS

| KR | 1020120019784 A | 3/2012 |
|---|---|---|
| KR | 1020150095415 A | 8/2015 |
| KR | 101769933 B1 | 8/2017 |
| KR | 1020170142681 A | 12/2017 |
| KR | 1020170142688 A | 12/2017 |

* cited by examiner

BACKLIGHT UNIT AND DISPLAY DEVICE HAVING THE SAME

The application claims priority to Korean patent application No. 10-2019-0069613 filed on Jun. 12, 2019, and all the benefits accruing therefrom under 35 U.S.C. § 119, the content of which in its entirety is herein incorporated by reference.

BACKGROUND

1. Technical Field

The present disclosure relates to a backlight unit and a display device having the same.

2. Related Art

Among display devices, there is a display device that requires a backlight unit capable of generating light so that the display device may display an image using light emitted from the backlight unit. The backlight unit is a device configured to supply light to a display panel including liquid crystals, etc., and includes a light source and a light guide member for transferring light emitted from the light source to the display panel. The backlight unit may be generally classified as an edge type backlight unit or a direct type backlight unit according to an installation position of the light source.

SUMMARY

In the direct type backlight unit, a light source is located at a point directly under a light irradiation area in a display area, and hence a white-spot phenomenon occurs, in which the point at which the light source is located in the corresponding light irradiation area appears brighter than the other areas. Increasing the thickness of a light guide member while interposing an air gap between the light source and the light guide member may reduce the white-spot phenomenon. However, by this method, the thickness of the backlight unit increases due to the air gap and the increased thickness, and therefore, it may be difficult to implement a slim display device.

Exemplary embodiments provide a slim backlight unit including an optical member having a first layer defining concave parts and a second layer that is disposed on the first layer and includes a plurality of optical patterns on an upper surface thereof.

Exemplary embodiments also provide a display device having the backlight unit.

According to an exemplary embodiment, there is provided a backlight unit including a light source array including at least one light source which emits light and a circuit board on which the light source is disposed, and a first optical layer disposed on the light source array. The first optical layer includes a first layer which defines at least one concave portion in a bottom of the first layer, where the at least one concave portion is coupled to the light source, a second layer disposed on the first layer, the second layer guiding light incident from the first layer in one direction, a plurality of optical patterns disposed on one surface of the second layer, the plurality of optical patterns selectively emitting light passing through the one surface, and a reflective layer disposed on the bottom of the first layer.

In an exemplary embodiment, the concave portion may have a shape recessed toward a top of the first layer from the bottom of the first layer.

In an exemplary embodiment, the first layer may have at least two different thicknesses depending on a region.

In an exemplary embodiment, the first layer may include at least one light diffusion particle that scatters light received from the light source.

In an exemplary embodiment, the second layer may include a transparent material.

In an exemplary embodiment, the plurality of optical patterns may be integrally provided with the second layer.

In an exemplary embodiment, at least one region of the one surface of the second layer may include an uneven surface.

In an exemplary embodiment, each of the plurality of optical patterns may have a shape protruding toward an upper portion from the one surface of the second layer.

In an exemplary embodiment, each of the plurality of optical patterns may have a shape recessed toward a lower portion from the one surface of the second layer.

In an exemplary embodiment, a distance of the optical pattern from an adjacent optical pattern thereto may decrease as the optical pattern is more distant from a point, corresponding to the light source, on the one surface of the second layer.

In an exemplary embodiment, the optical pattern may have a size that increases as being more distant from the point, corresponding to the light source, on the one surface of the second layer.

In an exemplary embodiment, the reflective layer may define an opening portion corresponding to the concave portion. The opening portion may be a through hole that penetrates at least one region of the reflective layer In an exemplary embodiment, the first optical layer may further include an interlayer disposed between the first layer and the second layer. The interlayer may include a pressure sensitive adhesive (PSA) or an optically clear adhesive (OCA).

In an exemplary embodiment, the reflective layer, the first layer, and the second layer may be integrally laminated, to constitute the first optical layer.

In an exemplary embodiment, the first optical layer may further include a sub-layer disposed on the second layer and the plurality of optical patterns. The sub-layer may diffuse light incident from the optical patterns.

In an exemplary embodiment, an adhesive layer may be disposed between the second layer and the sub-layer.

In an exemplary embodiment, the first optical layer may further include a color conversion layer disposed on the second layer. The color conversion layer may generate converted light by converting a color of light incident from the plurality of optical patterns.

In an exemplary embodiment, the backlight unit may further include a second optical layer disposed on the first optical layer. The second optical layer may control an advancing direction of light incident from the first optical layer.

According to an exemplary embodiment, there is provided a display device including a display panel which displays an image, and a backlight unit which provides light for displaying the image to the display panel. The backlight unit includes a light source array including at least one light source which emits light and a circuit board on which the light source is disposed, a first optical layer disposed on the light source array, and a second optical layer disposed on the first optical layer to control an advancing direction of light incident from the first optical layer. The first optical layer includes, a first layer defining at least one concave portion in a bottom of the first layer, where the at least one concave portion is coupled to the light source, a second layer disposed on the first layer, the second layer guiding light incident from the first layer toward the display panel, a plurality of optical patterns disposed on one surface of the second layer, the plurality of optical patterns selectively emitting light passing through the one surface, and a reflective layer disposed on the bottom of the first layer. The reflective layer defines an opening portion corresponding to the at least one concave portion.

BRIEF DESCRIPTION OF THE DRAWINGS

Exemplary embodiments will now be described more fully hereinafter with reference to the accompanying drawings. however, they may be embodied in different forms and should not be construed as limited to the exemplary embodiments set forth herein. Rather, these exemplary embodiments are provided so that this disclosure will be thorough and complete, and will fully convey the scope of the exemplary embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
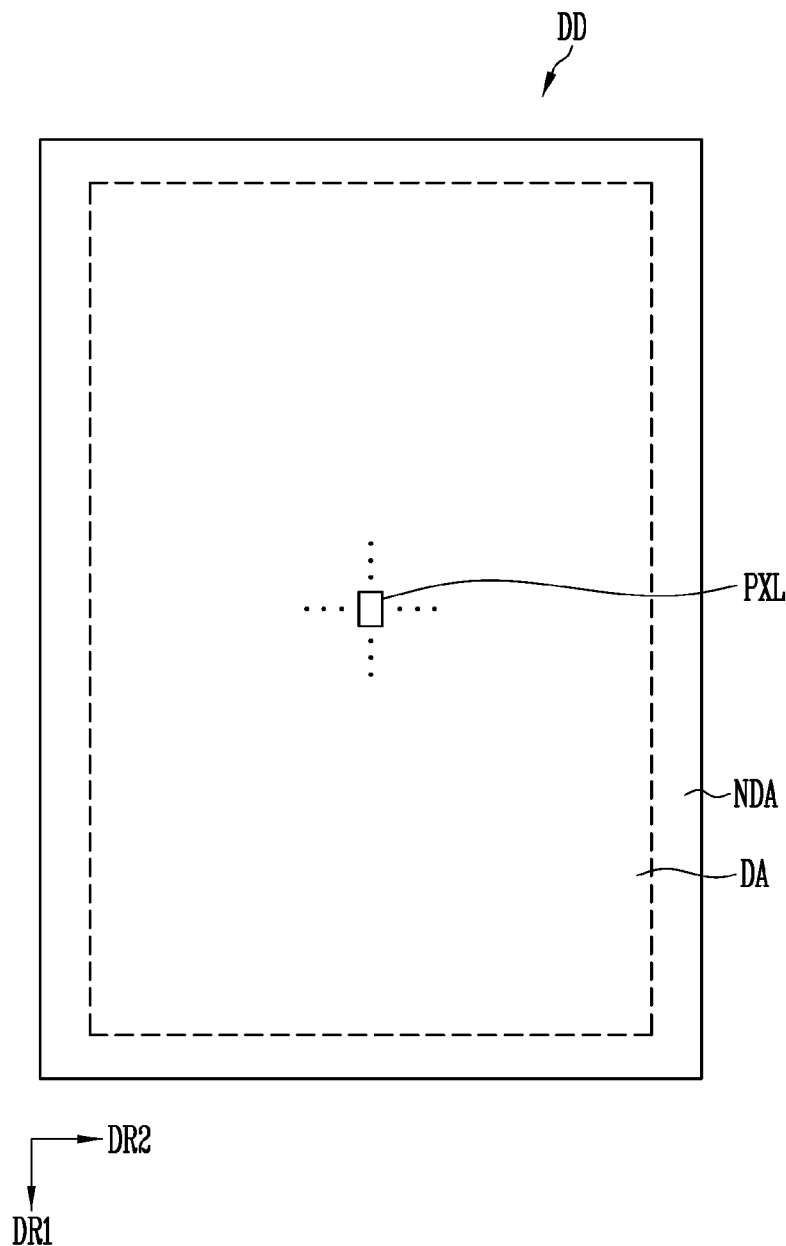
FIG. 1 is a plan view schematically illustrating a display device in accordance with an exemplary embodiment of the present disclosure.

The present disclosure may apply various changes and different shape, therefore only illustrate in details with particular examples. However, the examples do not limit to certain shapes but apply to all the change and equivalent material and replacement. The drawings included are illustrated a fashion where the figures are expanded for the better understanding.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof. Further, an expression that an element such as a layer, region, substrate or plate is placed "on" or "above" another element indicates not only a case where the element is placed "directly on" or "just above" the other element but also a case where a further element is interposed between the element and the other element. On the contrary, an expression that an element such as a layer, region, substrate or plate is placed "beneath" or "below" another element indicates not only a case where the element is placed "directly beneath" or "just below" the other element but also a case where a further element is interposed between the element and the other element. Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Hereinafter, exemplary embodiments of the present disclosure and items required for those skilled in the art to easily understand the content of the present disclosure will be described in detail with reference to the accompanying drawings. In the following description, singular forms in the present disclosure are intended to include the plural forms as well, unless the context clearly indicates otherwise.

Figure 2:
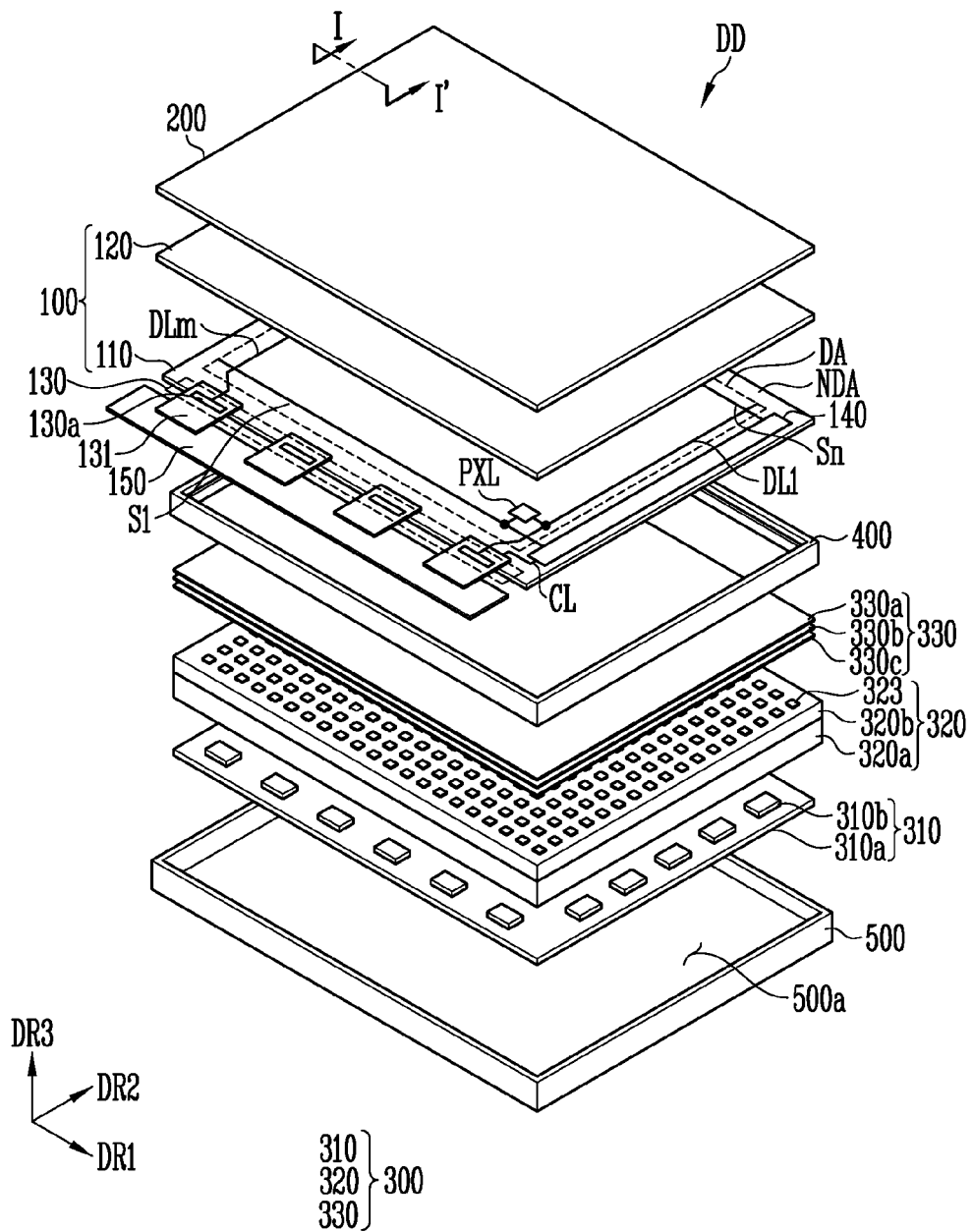
FIG. 2 is a schematic exploded perspective view of the display device shown in FIG. 1.
Figure 3:
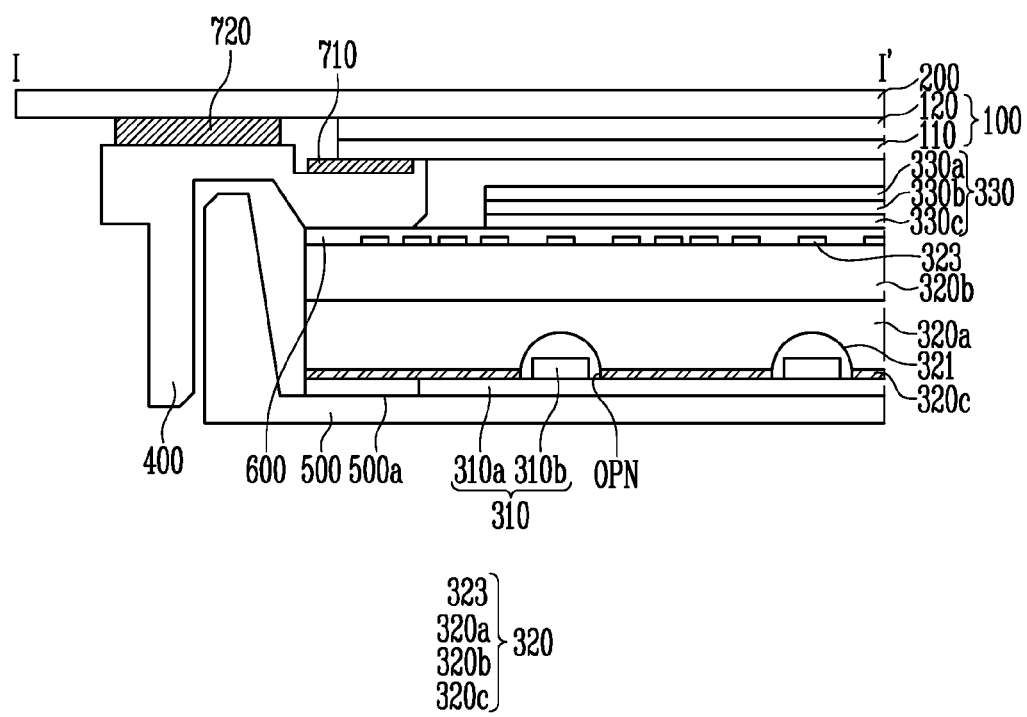
FIG. 3 is a sectional view taken along line I-I' shown in FIG. 2.

FIG. 1 is a plan view schematically illustrating a display device in accordance with an exemplary embodiment of the present disclosure. FIG. 2 is a schematic exploded perspective view of the display device shown in FIG. 1. FIG. 3 is a sectional view taken along line I-I' shown in FIG. 2.

Referring to FIGS. 1 to 3, the display device DD may include a display panel 100, a scan driver 140, a data driver 130, a driving circuit board 150, a touch sensor 200, a backlight unit 300, a mold frame 400, and a housing 500.

The display device DD may include a display area DA in which an image is displayed and a non-display area NDA surrounding at least one side of the display area DA in a plan view. In an exemplary embodiment of the present disclosure, the non-display area NDA may be an area in which the image is not displayed.

The display device DD may be provided in various shapes. In an example, the display device DD may be provided in a rectangular plate shape having two pairs of sides parallel to each other, but the present disclosure is not limited thereto. When the display device DD is provided in the rectangular plate shape, any one pair of sides among the two pairs of sides may be provided longer than the other pair of sides. Hereinafter, a case where the display device DD is provided in a rectangular shape having a pair of long sides and a pair of short sides is illustrated for convenience of description. The extending direction of the long sides is represented as a first direction DR1, and the extending direction of the short sides is represented as a second direction DR2.

The display panel 100 may have various shapes, and have a shape corresponding to the display device DD. In particular, the display panel 100 may have a short side in the second direction DR2 and have a long side in the first direction DR1 intersecting the second direction DR2. In some exemplary embodiments, the display panel 100 may have a closed polygonal shape including straight sides. In addition, the display panel 100 may have a shape such as a circle and an ellipse, which include a curved surface. In addition, the display panel 100 may have a semi-circular or semi-elliptical shape including curved and straight sides.

The display panel 100 may include a display area DA in which an image is displayed and a non-display area NDA surrounding at least one side of the display area DA. The display area DA of the display panel 100 may correspond to the display area DA of the display device DD, and the non-display area NDA of the display panel 100 may correspond to the non-display area NDA of the display device DD.

Non-luminescent display panels such as a liquid crystal display ("LCD") panel, an electrophoretic display ("EPD") panel, and an electro-wetting display ("EWD") panel may be used as the display panel 100 in an exemplary embodiment. When the non-luminescent display panel is used as the display panel 100 of the display device DD according to an exemplary embodiment of the present disclosure, the display device DD may include a backlight unit for supplying light to the display panel 100. In another exemplary embodiment, self-luminescent display panels such as an organic light emitting display ("OLED") panel may be used as the display panel 100. When the OLED panel is used as the display panel 100, the backlight unit 300 that supplies light to the display panel 100 may not be provided. Hereinafter, a case that the display panel 100 is the LCD panel is illustrated for convenience of description.

The display panel 100 may include a first substrate 110, a second substrate 120 facing the first substrate 110, and a liquid crystal layer (not shown) provided between the first substrate 110 and the second substrate 120. A polarizing film (not shown) may be provided on each of both sides of the display panel 100, i.e., each of outer surfaces of the first and second substrates 110 and 120.

A plurality of pixels PXL, a plurality of scan lines S1 to Sn, and a plurality of data lines DL1 to DLm may be arranged in the display area DA of the first substrate 110. Here, m and n are natural numbers. For convenience of description, although only one pixel PXL is illustrated in FIG. 2, the plurality of pixels PXL may be substantially arranged in the display area DA of the first substrate 110.

The scan lines S1 to Sn and the data lines DL1 to DLm may be disposed to intersect each other while being insulated from each other. The scan lines S1 to Sn may extend in the first direction DR1 to be electrically connected to the scan driver 140, respectively. The data lines DL1 to DLm may extend in the second direction DR2 to be electrically connected to the data driver 130, respectively.

The pixels may be disposed in areas divided (or defined) by the scan lines S1 to Sn and the data lines DL1 to DLm, which intersect each other. The pixels PXL may be arranged in a matrix form to be electrically connected to the scan lines S1 to Sn and the data lines DL1 to DLm. The arrangement form of the pixels PXL is not particularly limited, and the pixels PXL may be arranged in various forms. Each of the pixels PXL may include at least one transistor (not shown) electrically connected to one scan line and one data line and a pixel electrode (not shown) connected to the transistor.

The scan driver 140 may be disposed in a predetermined area adjacent to one side of the first substrate 110 in the second direction DR2. The scan driver 140 may be simultaneously formed with the transistor of each pixel PXL through the same process, to be mounted in the form of an Amorphous Silicon TFT Gate ("ASG") driver circuit or an Oxide Silicon TFT Gate ("OSG") driver circuit on the first substrate 110. However, the present disclosure is not limited thereto. In some exemplary embodiments, the scan driver 140 may be provided in the form of a plurality of driving chips and be mounted on a flexible printed circuit board, to be connected to the first substrate 110 in the form of a Tape Carrier Package ("TCP"). In other exemplary embodiments, the scan driver 140 may be provided in the form of a plurality of driving chips, to be mounted in the form of a Chip-On-Glass ("COG") on the first substrate 110.

A timing controller (not shown) may be disposed on the driving circuit board 150. The timing controller may be mounted in the form of an integrated circuit chip on the driving circuit board 150, to be connected to the scan driver 140 and the data driver 130. The timing controller may output a scan control signal, a data control signal, and image data.

The scan driver 140 may receive the scan control signal from the timing controller through a control line CL. The scan driver 140 may generate a plurality of scan signals in response to the scan control signal, and sequentially output the generated scan signals. The scan signals may be provided in units of rows to the pixels PXL through the scan lines S1 to Sn. Accordingly, the pixels PXL can be driven by units of rows.

The data driver 130 may include a plurality of source driving chips 130a. Each of the source driving chips 130a may be mounted on a flexible circuit board 131, to be connected to a predetermined area at one side of the first substrate 110 and at one side of the driving circuit board 150 in the second direction DR2. That is, the data driver 130 may be connected to the first substrate 110 and the driving circuit board 150 in the form of a Tape Carrier Package (TCP), but the present disclosure is not limited thereto. In some exemplary embodiments, the source driving chips 130a of the data driver 130 may be mounted in the form of a Chip-On-Glass (COG) on the first substrate 110.

The data driver 130 receives image data and the data control signal from the timing controller. The data driver 130 may generate and output data voltages corresponding to the image data in response to the data control signal. The data voltages may be transferred to the pixels PXL through the data lines DL1 to DLm.

The pixels PXL may be supplied with the data voltages through the data lines DL1 to DLm in response to the scan signals transferred through the scan lines S1 to Sn. The pixels PXL displays grayscales corresponding to the data voltages, so that an image can be displayed.

A color filter (not shown) that realizes a predetermined color by using light provided from the backlight unit 300 and a common electrode (not shown) formed on the color filter to face the pixel electrode may be provided on one surface of the second substrate 120. The color filter may have any one color among red, green, blue, cyan, magenta, white, and yellow, and be formed through a process such as deposition or coating. Although a case where the color filter is disposed on the second substrate 120 is described in the above-described exemplary embodiment, the present disclosure is not limited thereto. In some exemplary embodiments, the color filter may be disposed on the first substrate 110.

Liquid crystal molecules in the liquid crystal layer are arranged in a specific direction by an electric field formed between the pixel electrode and the common electrode, so that the display panel 100 can display an image by controlling the transmittance of light emitted from the backlight unit 300.

The touch sensor 200 may be disposed on at least one of both surfaces of the display panel 100. In an example, the touch sensor 200 may be disposed on one surface of the display panel 100 in a direction in which an image is displayed, to receive a touch input of a user. In some exemplary embodiments, the touch sensor 200 may be integrally formed with the display panel 100.

The touch sensor 200 may sense a touch event of the display device DD by a hand of a user or a separate input means. The touch sensor 200 may sense a touch event by using a capacitance method. For example, the touch sensor 200 may sense a touch input by using a mutual capacitance method or self-capacitance method.

In an exemplary embodiment of the present disclosure, the backlight unit 300 may be disposed on one surface of the display panel 100 in a direction opposite to that in which the image is displayed. The backlight unit 300 may include a light source array 310, a first optical layer 320, and a second optical layer 330.

The light source array 310 may include a printed circuit board 310a and a plurality of light sources 310b mounted on the printed circuit board 310a. In an exemplary embodiment of the present disclosure, each of the light sources 310b may include a light emitting diode ("LED"). The light sources 310b may be mounted on the printed circuit board 310a, and emit lights of the same color. In an example, the light sources 310b may emit lights of blue. Each of the light sources 310b may be electrically connected to the printed circuit board 310a, and receive a signal (or power) transferred from the printed circuit board 310a to emit light. Each of the light sources 310b may form a point light source, and be mounted on the printed circuit board 310a to have the same interval with adjacent light sources 310b.

The first optical layer 320 may be located on a lower surface of the display panel 100, and allow light emitted from the light source array 310 to be radiated toward the display panel 100 by guiding the light. In an example, the first optical layer 320 may be disposed between the light source array 310 and the second optical layer 330.

In an exemplary embodiment of the present disclosure, the first optical layer 320 may include a first layer 320a, a second layer 320b, a plurality of optical patterns 323, and a reflective layer 320c.

The first layer 320a may be provided and/or formed between the light source array 310 and the second layer 320b. The first layer 320a may be a diffusion member that allows lights emitted from the light sources 310b to advance into the second layer 320b by diffusing and/or scattering the lights. In an exemplary embodiment of the present disclosure, the first layer 320a may define a plurality of concave portions 321 in the lower surface S11 thereof.

The first layer 320a may include a transparent material that enables light to pass therethrough. In an example, the transparent material may include at least one of a polycarbonate ("PC") based material, a polystyrene ("PS") based material, and a silicon-based material. However, the material of the first layer 320a is not limited to the above-described materials. In some exemplary embodiments, the first layer 320a may be formed of, or include materials that enable the lights emitted from the light sources 310b to pass therethrough by diffusing and/or scattering the lights. The first layer 320a defining the concave portions 321 may include light diffusion particles to diffuse and/or scatter lights emitted from the light sources 310b into the second layer 320b.

Each of the concave portion 321 may have a semi-elliptical shape protruding toward an upper portion from one surface, e.g., a lower surface of the first layer 320a, but the present disclosure is not limited thereto. In some exemplary embodiments, each of the concave portions 321 may be provided in various shapes such as a semicircular shape and a lens shape. The concave portions 321 may be integrally provided with the first layer 320a. The concave portions 321 may have a shape recessed toward the upper portion from the lower surface of the first layer 320a and made using a laser beam.

In an exemplary embodiment of the present disclosure, the concave portions 321 may be disposed at the lower surface of the first layer 320a to correspond to the light sources 310b of the light source array 310, respectively. The concave portions 321 may be disposed at the lower surface of the first layer 320a to have a number equal to that of the light sources 310b. Therefore, the concave portions 321 and the light sources 310b may be disposed to form one-to-one (1:1) pairs. In an exemplary embodiment of the present disclosure, each of the light sources 310b may be inserted and coupled to a corresponding concave portion 321. Accordingly, the concave portions 321 and the light sources 310b can overlap with each other in the plan view.

The reflective layer 320c may be disposed between the first layer 320a and the light source array 310. The reflective layer 320c may reflect, toward the second layer 320b, light diffused and/or scattered toward the reflective layer 320c from the first layer 320a, to further increase an amount of light provided toward the display panel 100.

The reflective layer 320c may include a material that reflects light. In an example, the reflective layer 320c may include a conductive material having a constant reflexibility, such as Ag, and include a reflective sheet made of a material including one or two or more of a polycarbonate based material, polysulfone based material, a polyacrylate based material, a polystyrene based material, a poly vinyl chloride based material, a poly vinyl ahol based material, a polynorbornene based material, and a poly ester based material. However, the material of the reflective layer 320c is not limited to the above-described materials.

In an exemplary embodiment of the present disclosure, the reflective layer 320c may define a plurality of opening portions OPN. Each of the opening portions OPN may be an empty space opened by removing one region of the reflective layer 320c. In an example, each of the opening portions OPN may be a through hole penetrating at least one region of the reflective layer 320c.

In an exemplary embodiment of the present disclosure, the opening portions OPN may be defined at positions corresponding to the concave portions 321 of the first layer 320a, respectively. In particular, the opening portions OPN may be provided to have a number equal to that of the concave portions of the first layer 320a. Therefore, the opening portions OPN and the concave portions 321 may be disposed to correspond one-to-one (1:1) to each other. As described above, since the concave portions 321 correspond one-to-one (1:1) to the light sources 310b, the opening portions OPN may also correspond one-to-one (1:1) to the light sources 310b.

The second layer 320b may be disposed between the first layer 320a and the second optical layer 330. The second layer 320b may be a light guide member that guides light incident from the first layer 320a toward the display panel 100.

In an exemplary embodiment of the present disclosure, the second layer 320b may include a glass or silicon material that is one of transparent materials that enable light to pass therethrough while having small influence on temperature (or excellent thermal resistance), but the present disclosure is not limited thereto. In some exemplary embodiments, the second layer 320b may include a plastic material such as polymethylmethacrylate ("PMMA") that is an acrylic transparent resin. In an exemplary embodiment of the present disclosure, the second layer 320b may include a material that has excellent thermal resistance and a light transmittance of 80% or more.

The optical patterns 323 may be disposed on an upper surface of the second layer 320b. Each of the optical patterns 323 may be a light emission pattern that selectively emits light which is guided or totally reflected in the second layer 320b toward the display panel 100. The optical patterns 323 may be formed on the upper surface of the second layer 320b through a printing process or an injection molding process. The optical patterns 323 may have the same size, but the present disclosure is not limited thereto. In some exemplary embodiments, the optical patterns 323 may have different sizes from each other.

Each of the optical patterns 323 may be spaced apart from adjacent patterns 323 at different distances. In an example, the distance of each of the optical patterns 323 from an adjacent optical pattern 323 thereto may decrease as the optical pattern 323 is more distant from a point of the upper surface of the second layer 320b at which the upper surface overlaps with each of the light sources 310b in the plan view. For convenience of description, in the following exemplary embodiment, the point of the upper surface of the second layer 320b at which the upper surface overlaps with the light source 310b is referred to as a 'reference region.'

In an exemplary embodiment of the present disclosure, each of the optical patterns 323 may be disposed on the upper surface of the second layer 320b such that the distance of the optical pattern 323 from an adjacent optical pattern 323 decreases as the optical pattern 323 is more distant from the reference region, and increases as the optical pattern 323 is closer to the reference region. Accordingly, the density of the optical patterns 323 may be changed depending on a region. In an example, the density of the optical patterns 323 may be higher as the optical patterns 323 are more distant from the reference region, and be lower as the optical patterns 323 are closer to the reference region. That is, the optical patterns 323 may be concentratedly disposed in one region of the upper surface of the second layer 320b, which does not overlap with each of the light sources 310b.

The second optical layer 330 may be disposed between the first optical layer 320 and the display panel 100. The second optical layer 330 may function to control light that is emitted from the light source array 310 and then transmitted through the first optical layer 320. The second optical layer 330 may include a diffusion sheet 330c, a light condensing sheet 330b, and a protective sheet 330a, which are sequentially stacked.

The diffusion sheet 330c may be disposed between the first optical layer 320 and the light condensing sheet 330b, and diffuse light radiated from the first optical layer 320. The light condensing sheet 330b may be disposed between the diffusion sheet 330c and the protective sheet 330a. The light condensing sheet 330b may be a prism sheet that condenses light diffused from the diffusion sheet 330c in a direction perpendicular to a plane of the display panel 100 disposed on the top thereof. Most of lights passing through the light condensing sheet 330b may be perpendicularly incident into the display panel 100. The protective sheet 330a may be provided and/or formed between the light condensing sheet 330b and the display panel 100. The protective sheet 330a may be a protective sheet that protects the light condensing sheet 330b from external impact.

The second optical layer 330 including the diffusion sheet 330c, the light condensing sheet 330b, and the protective sheet 330a may be coupled to the first optical layer 320 through an adhesive layer 600. In an exemplary embodiment of the present disclosure, the adhesive layer 600 may include an optically clear adhesive ("OCA").

Although a case where the second optical layer 330 includes one diffusion sheet 330c, one light condensing sheet 330b, and one protective sheet 330a is described in the above-described exemplary embodiment, the present disclosure is not limited thereto. In some exemplary embodiments, the second optical layer 330 may further include an optical sheet for performing another function, in addition to the diffusion sheet 330c, the light condensing sheet 330b, and the protective sheet 330a. Also, in some exemplary embodiments, one or more optical sheets among the diffusion sheet 330c, the light condensing sheet 330b, and the protective sheet 330a may be omitted in the second optical layer 330. Also, in some exemplary embodiments, a specific type of optical sheet may be provided in plurality in the second optical layer 330, and the order in which the optical sheets are stacked may be changed depending on purposes of an applied product. Therefore, the present disclosure is not particularly limited in the number of optical sheets and the order in which the optical sheets are stacked in the second optical layer 330. Also, in some exemplary embodiments, the second optical layer 330 may further include a reflective polarizing sheet that modulates light incident from the first optical layer 320 into light linearly polarized in a specific direction. Also, the second optical layer 330 may further include an absorptive polarizing sheet that absolves light other than the light linearly polarized in the specific direction among lights incident into the display panel 100 so that the light other than the light linearly polarized may not pass through the display panel 100.

The mold frame 400 may be provided and/or formed between the display panel 100 and the backlight unit 300. The mold frame 400 may have a shape corresponding to the display panel 100 and the backlight unit 300. The mold frame 400 may have a shape of which inside is opened to accommodate the display panel 100 and the backlight unit 300. The mold frame 400 may include at least one holding projection protruded from and provided along a sidewall of the mold frame 400. The display panel 100 may be mounted on one holding projection, and a lower portion of the holding projection may be in contact with the first optical layer 320. The touch sensor 200 may be mounted on another holding projection of the mold frame 400.

The mold frame 400 may have a coupling groove coupled to a portion of the housing 500. The mold frame 400 along with the housing 500 may support and fix the display panel 100 and the backlight unit 300. The mold frame 400 may include a synthetic resin having an insulating property.

A first adhesive tape 710 and a second adhesive tape 720 may be provided on an upper surface of the mold frame 400. One of the first and second adhesive tapes 710 and 720 (e.g., the first adhesive tape 710) may fix the display panel 100 to the mold frame 400. The other of the first and second adhesive tapes 710 and 720 (e.g., the second adhesive tape 720) may fix the touch sensor 200 to the mold frame 400. The second adhesive tape 720 may have elasticity capable of absorbing pressure or impact generated when a user touches the touch sensor 200.

The housing 500 may be provided on the bottom of the backlight unit 300. The housing 500 may include an accommodation space 500a capable of accommodating the display panel 100 and the backlight unit 300. The housing 500 may accommodate the display panel 100 and the backlight unit 300 in the accommodation space 500a, and support the display panel 100 and the backlight unit 300.

Figure 4:
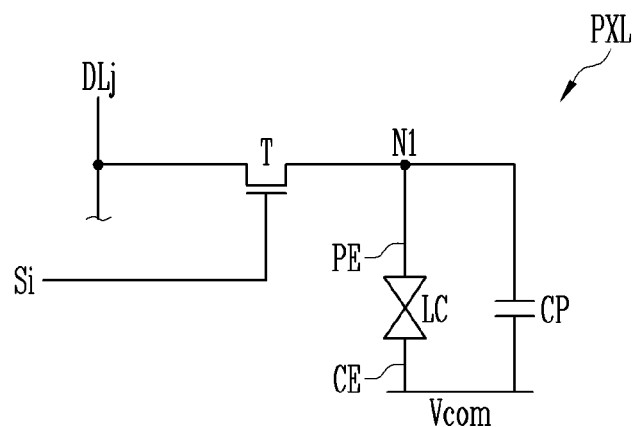
FIG. 4 is an equivalent circuit diagram illustrating an electrical connection relationship of components included in one pixel among pixels shown in FIG. 2.

FIG. 4 is an equivalent circuit diagram illustrating an electrical connection relationship of components included in one pixel among the pixels shown in FIG. 2.

For example, FIG. 4 illustrates an electrical connection relationship of components included in a pixel PXL applicable to an active display device. However, kinds of the components included in the pixel PXL to which an exemplary embodiment of the present disclosure is applicable are not limited thereto.

In FIG. 4, the pixel PXL includes even an area in which the components of the pixel PXL are provided in addition to the components included in the pixel PXL. In some exemplary embodiments, the pixel PXL shown in FIG. 4 may be any one of the pixels PXL provided in the display device DD shown in FIGS. 1 and 2, and the pixels PXL may have structures substantially identical or similar to one another.

Referring to FIGS. 1 and 4, the pixel PXL may include a transistor T, a liquid crystal cell LC, and a capacitor CP.

The transistor T may be connected between a j-th data line DLj and a first node N1, and a gate electrode of the transistor T may be connected to an i-th scan line Si. The transistor T may be turned on when a scan signal is supplied to the i-th scan line Si. When the transistor T is turned on, a data signal supplied to the j-th data line DLj may be supplied to the first node N1. The first node N1 is a node commonly connected to the transistor T, the liquid crystal cell LC, and the capacitor CP, and may be connected to a pixel electrode PE of the capacitor CP.

The liquid crystal cell LC and the capacitor CP may be connected between the first node N1 and a common power source Vcom. The common power source Vcom may supply a common voltage to the liquid crystal cell LC and the capacitor CP through a common electrode CE of the liquid crystal cell LC and the capacitor CP. Each of the liquid crystal cell LC and the capacitor CP may include the pixel electrode PE connected to the first node N1 and the common electrode CE connected to the common power source Vcom.

When the transistor T is turned on, the data signal supplied to the j-th data line DLj may be supplied to the first node N1. The common voltage of the common power source Vcom may be supplied to the common electrode CE of the liquid crystal cell LC. Therefore, the arrangement of liquid crystal molecules of the liquid crystal cell LC is changed by an electric field applied between the pixel electrode PE and the common electrode CE, so that the direction or intensity of light supplied from the backlight unit 300 can be controlled. Accordingly, a grayscale corresponding to the data signal can be expressed.

In addition, the data signal passing through the transistor T may be stored in the capacitor CP. To this end, the capacitor CP may be connected between a second terminal of the transistor T and the common electrode CE, between the second terminal of the transistor T and a previous scan line, or the like. The capacitor CP may constantly maintain a voltage of the liquid crystal cell LC until a data signal of a next frame is supplied.

Figure 5:
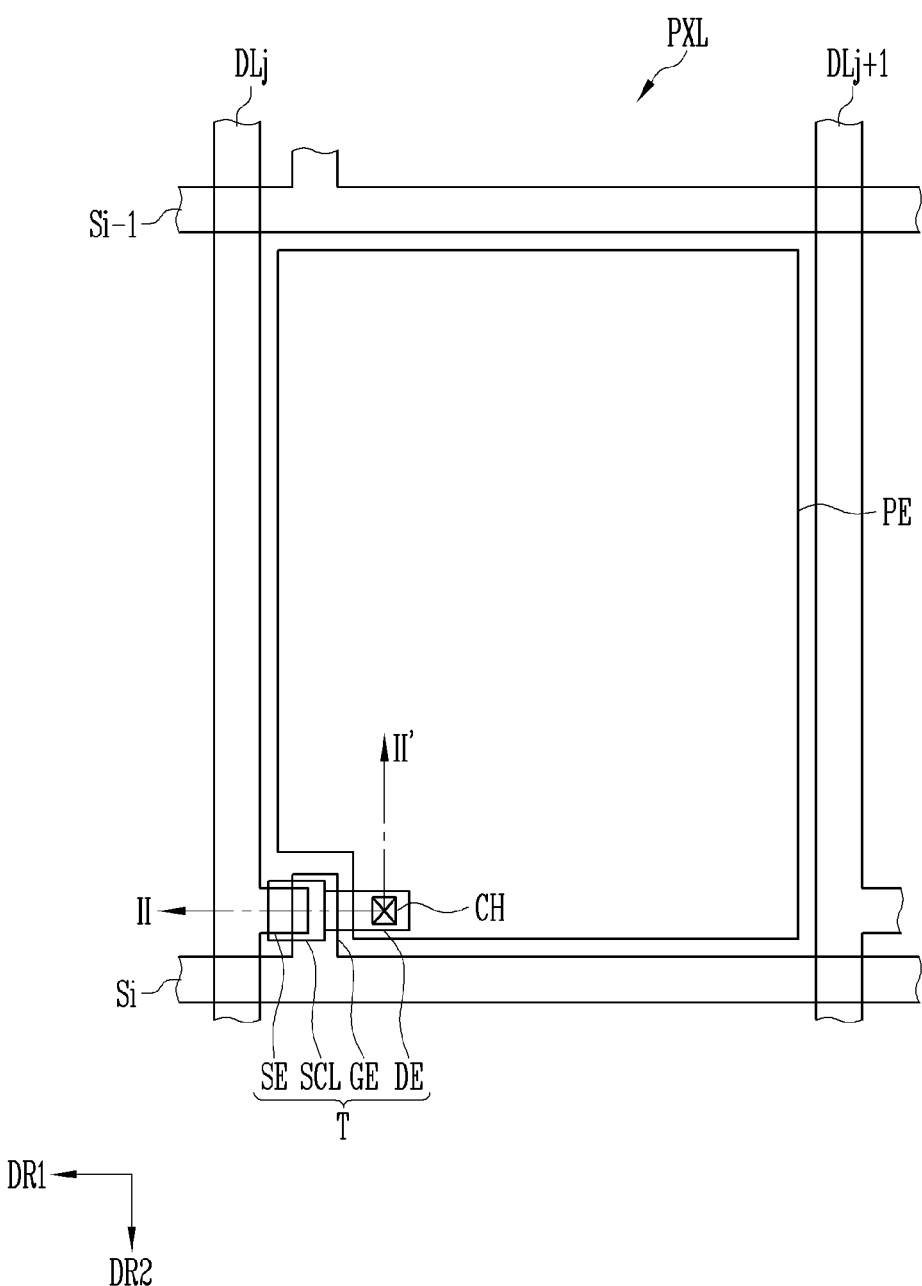
FIG. 5 is a plan view illustrating one pixel shown in FIG. 2.
Figure 6:
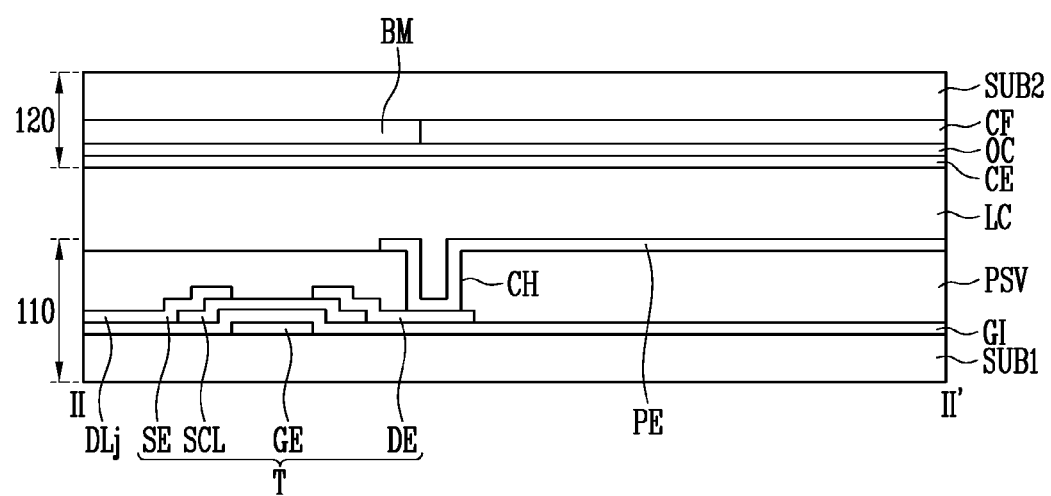
FIG. 6 is a sectional view taken along line II-II' shown in FIG. 5.

FIG. 5 is a plan view illustrating one pixel shown in FIG. 2. FIG. 6 is a sectional view taken along line II-II' shown in FIG. 5.

Referring to FIGS. 1 to 6, the display panel 100 may include a first substrate 110, a second substrate 120 facing the first substrate 110, and a liquid crystal layer LC disposed between the first substrate 110 and the second substrate 120.

The first substrate 110 may include a first base substrate SUB1, a plurality of scan lines S1 to Sn, a plurality of data lines DL1 to DLm, and a plurality of pixels PXL.

The first base substrate SUB1 may include a transparent insulating material to enable light to be transmitted therethrough. The first base substrate SUB1 may be a rigid substrate or flexible substrate.

For example, the rigid substrate may include a glass substrate, a quartz substrate, a glass ceramic substrate, a crystalline glass substrate, or the like. For example, the flexible substrate may include a film substrate or a plastic substrate, which includes a polymer organic material. Specifically, the rigid substrate may include polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, or the like. However, the material constituting the first base substrate SUB1 may be variously changed, and the first base substrate SUB1 may include a fiber reinforced plastic ("FRP"), etc.

The first substrate 110 is provided with a plurality of pixel areas arranged in a matrix form, the pixels PXL may be provided to correspond to the pixel areas, respectively. Each of the pixels PXL may be connected to a corresponding data line among the sequentially arranged data lines DL1 to DLm and a corresponding scan line among the sequentially arranged scan lines S1 to Sn. In an exemplary embodiment of the present disclosure, based on one pixel PXL disposed on an i-th row and a j-th column, which are disposed on the first substrate 110, a scan line Si and a data line Dj, which are connected to the one pixel PXL, are illustrated for convenience of description.

The scan line Si may extend in the first direction DR1 on the first base substrate SUB1. The data line DLj may be provided on the scan line Si with a gate insulating layer GI interposed therebetween. The data line DLj may extend in the second direction DR2 intersecting the scan line Si. The gate insulating layer GI may be provided on the entire surface of the first base substrate SUB1, and cover the scan line Si. In FIG. 5, an (i-1)th scan line Si-1 disposed in parallel to the scan line Si and a (j+1)th data line DLj+1 disposed in parallel to the data line DLj are illustrated together with the scan line Si and the data line DLj.

One pixel PXL (hereinafter, referred to as a 'pixel') may include a transistor T connected to the scan line Si and the data line Dj and a pixel electrode PE connected to the transistor T.

The transistor T may include a gate electrode GE, a semiconductor layer SCL, a first terminal SE, and a second terminal DE.

The gate electrode GE may protrude from the scan line Si or be provided on a partial region of the scan line Si. The gate electrode GE may be made of a metal. The metal may include, for example, nickel, chromium, molybdenum, aluminum, titanium, copper, tungsten, or alloys thereof. The gate electrode GE may be provided as a single layer made of the metal or a multi-layer. In an example, the gate electrode GE may be provided as a triple layer in which molybdenum, aluminum, and molybdenum are sequentially stacked, or be provided as a double layer in which titanium and copper are sequentially stacked. Alternatively, in some exemplary embodiments, the gate electrode GE may be provided as a single layer made of an alloy of titanium and copper.

The gate insulating layer GI may be provided and/or formed over the gate electrode GE.

The semiconductor layer SCL may be disposed on the gate insulating layer GI. The semiconductor layer SCL may be disposed on the gate electrode GE with the gate insulating layer GI interposed therebetween. A partial region of the semiconductor layer SCL may overlap with the gate electrode GE. The semiconductor layer SCL may include one of amorphous silicon (a-Si), polycrystalline silicon (p-Si), and an oxide semiconductor. The oxide semiconductor may include at least one of Zn, In, Ga, Sn, and mixtures thereof. For example, the oxide semiconductor may include Indium-Gallium-Zinc Oxide ("IGZO").

The semiconductor layer SCL may include a first region in contact with the first terminal SE and a second region in contact with the second terminal DE. A region between the first region and the second region may be referred as a channel region. In another exemplary embodiment of the present disclosure, the semiconductor layer SCL may be provided as a structure in which an active layer made of an amorphous silicon material and an ohmic contact layer made of an impurity amorphous silicon material are sequentially stacked.

The first terminal SE may be provided and/or formed to branch off from the data line DLj. The first terminal SE may be connected to the first region of the semiconductor layer SCL, and a partial region of the first terminal SE may overlap with the gate electrode GE in the plan view.

The second terminal DE may be provided and/or formed to be spaced apart from the first terminal SE with a partial region of the semiconductor layer SCL, which is interposed therebetween. The second terminal DE may be connected to the second region of the semiconductor layer SCL, and a partial region of the second terminal DE may overlap with the gate electrode GE in the plan view. The second terminal DE may be electrically connected to the pixel electrode PE through a contact hole CH penetrating a passivation layer PSV.

The first terminal SE and the second terminal DE may be made of nickel, chromium, molybdenum, aluminum, titanium, copper, tungsten, or any alloy thereof.

The first terminal SE and the second terminal DE are spaced apart from each other, so that an upper surface of the semiconductor layer SCL between the first terminal SE and the second terminal DE can be exposed. The semiconductor layer SCL between the first terminal SE and the second terminal DE may form a conductive channel between the first terminal SE and the second terminal DE according to whether a voltage is applied to the gate electrode GE.

In the above-described exemplary embodiment, although a case where the first and second terminals SE and DE of each transistor T are separate electrodes electrically connected to the semiconductor layer SCL is illustrated, the present disclosure is not limited thereto. In some exemplary embodiments, the first terminal SE of the transistor T may be one of the first and second regions adjacent to the channel region of the semiconductor layer SCL, and the second terminal DE of the transistor T may be the other of the first and second regions adjacent to the channel region of the semiconductor layer SCL. The second terminal DE of the transistor T may be electrically connected to the pixel electrode PE through a bridge electrode, a contact electrode, or the like.

In the above-described exemplary embodiment, although a case where the transistor T is a transistor having a bottom gate structure is illustrated as an example, the present disclosure is not limited thereto. In some exemplary embodiments, the transistor T may be a transistor having a top gate structure.

The passivation layer PSV may be provided and/or formed over the transistor T. The passivation layer PSV may define the contact hole CH exposing a portion of the second terminal DE of the transistor T. The passivation layer PSV may include or be formed of an inorganic insulating layer including an inorganic material or an organic insulating layer including an organic material. In some exemplary embodiments, the passivation layer PSV may be provided in a form including an inorganic insulating layer covering the transistor T and an organic insulating layer disposed on the inorganic insulating layer.

The pixel electrode PE may be disposed on the passivation layer PSV.

The pixel electrode PE may be connected to the second terminal DE of the transistor T with the passivation layer PSV interposed therebetween. The pixel electrode PE may include a transparent conductive oxide. In an example, the transparent conductive oxide may include at least one of Indium Tin Oxide ("ITO"), Indium Zinc Oxide ("IZO"), Aluminum Zinc Oxide ("AZO"), Gallium doped Zinc Oxide ("GZO"), Zinc Tin Oxide ("ZTO"), Gallium Tin Oxide (GTO), and Fluorine doped Tin Oxide ("FTO").

The second substrate 120 may be a counter substrate facing the first substrate 110. The second substrate 120 may include a second base substrate SUB2, a color filter CF, a light blocking pattern BM, an overcoat layer OC, and a common electrode CE.

The second base substrate SUB2 may include the same material as the first base substrate SUB1. In an example, the second base substrate SUB2 may be a rigid substrate or flexible substrate.

The light blocking pattern BM may be disposed on the second base substrate SUB2. The light blocking pattern BM may be disposed at an area corresponding to the boundary of the pixel areas. The light blocking pattern BM may prevent light leakage due to misalignment of the liquid crystal molecules of the liquid crystal layer LC. In an example, the light blocking pattern BM may be a black matrix.

The color filter CF may be disposed on the second base substrate SUB2 exposed by the light blocking pattern BM. The color filter CF may have one color among red, green, blue, cyan, magenta, white, and yellow. The color filter CF may be disposed at an area corresponding to the pixel area. In the above-described exemplary embodiment, although a case where the color filter CF is included in the second substrate 120 is illustrated, the present disclosure is not limited thereto. In some exemplary embodiments, the color filter CF may be included in the first substrate 110.

The overcoat layer OC may cover the light blocking pattern BM and the color filter CF, thereby decreasing a step difference caused by the light blocking pattern BM and the color filter CF, and overcoat layer OC may be disposed on one surface of the second base substrate SUB2, e.g., a surface facing the first substrate 110.

The common electrode CE may be disposed on the light blocking pattern BM and the color filter CF. The common electrode CE may be insulated from the pixel electrode PE, and include the same material as the pixel electrode PE. The common electrode CE may receive a common voltage transferred from the outside. The common electrode CE may be disposed on one surface of the second substrate 120, which faces the first substrate 110. In the above-described exemplary embodiment, although a case where the common electrode CE is included in the second substrate 120 is illustrated, the present disclosure is not limited thereto. In some exemplary embodiments, the common electrode CE may be included in the first substrate 110 in a state in which the common electrode CE is insulated from the pixel electrode PE. At least one of the pixel electrode PE and the common electrode CE may be provided in a form including a plurality of slits.

The liquid crystal layer LC may include a plurality of liquid crystal molecules. The liquid crystal molecules may be arranged in a specific direction by an electric field applied between the pixel electrode PE and the common electrode CE, to control the transmittance of light through the liquid crystal layer LC. Thus, the liquid crystal layer LC enables the display panel 100 to display an image by allowing light provided from the backlight unit 300 to be transmitted therethrough.

Hereinafter, the components included in the backlight unit 300 will be described in more detail, based on a path along which light emitted from the light source array 310 advances.

Figure 7:
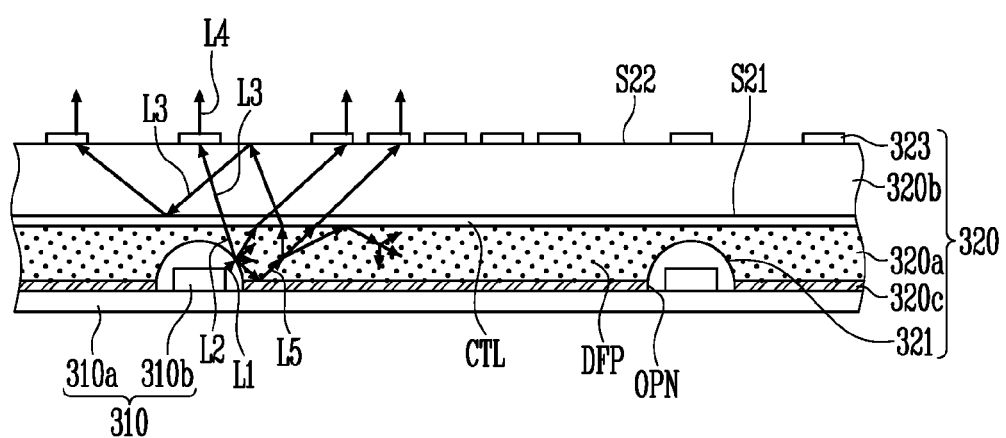
FIG. 7 is a sectional view illustrating a moving path of light emitted from a light source array shown in FIG. 3 to advance toward a first optical layer.
Figure 8A:
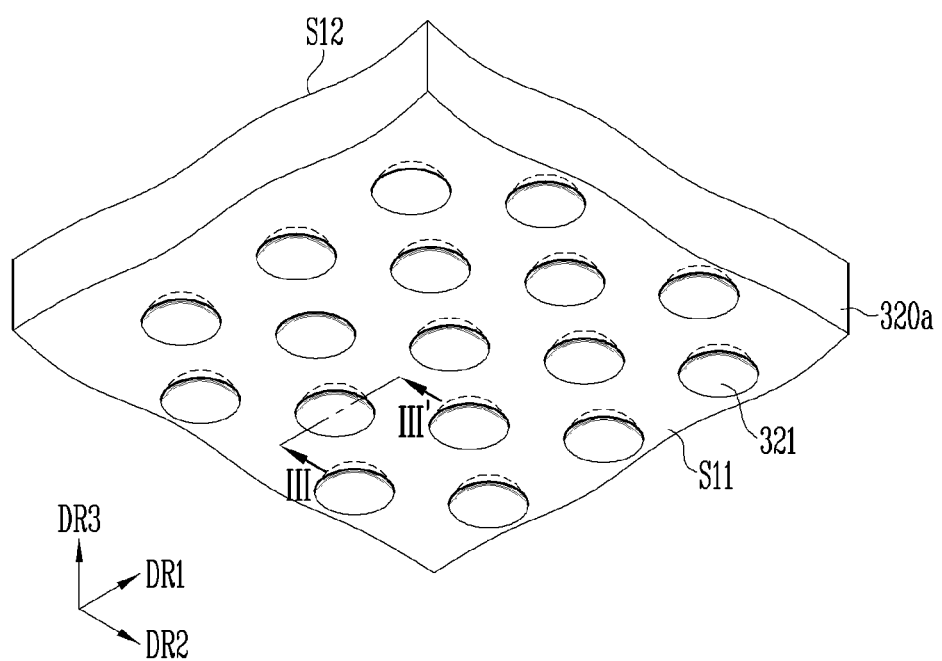
FIG. 8A is a rear perspective view of a first layer shown in FIG. 7.
Figure 8B:
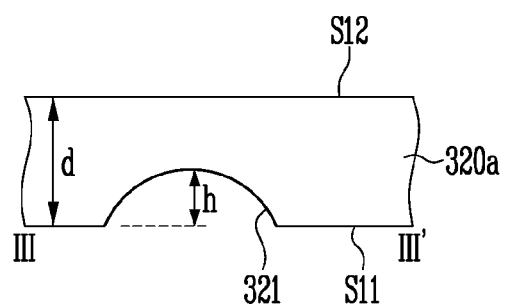
FIG. 8B is a sectional view taken along line III-III' shown in FIG. 8A.
Figure 9:
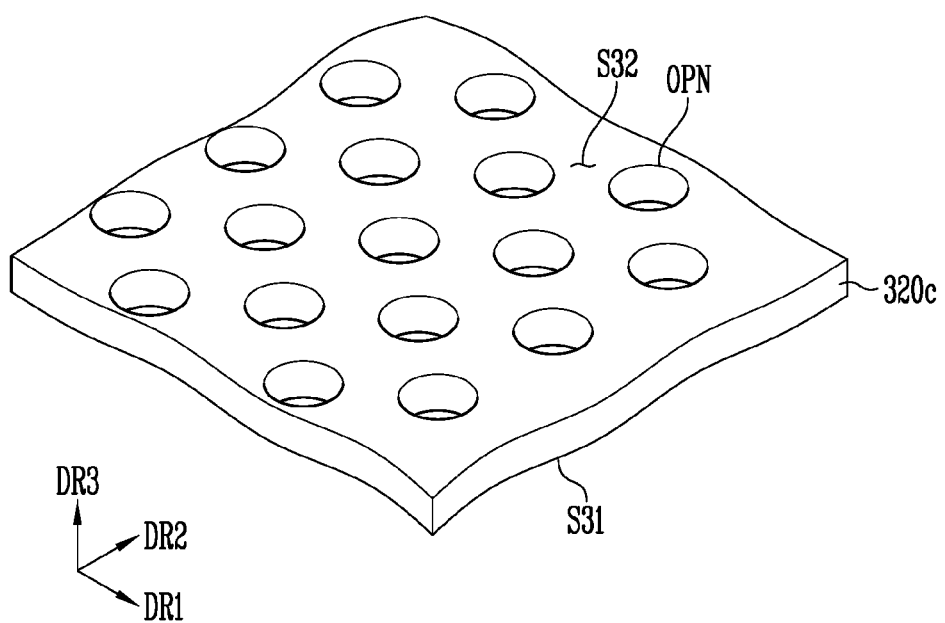
FIG. 9 is a perspective view of a reflective layer shown in FIG. 7.
Figure 10:
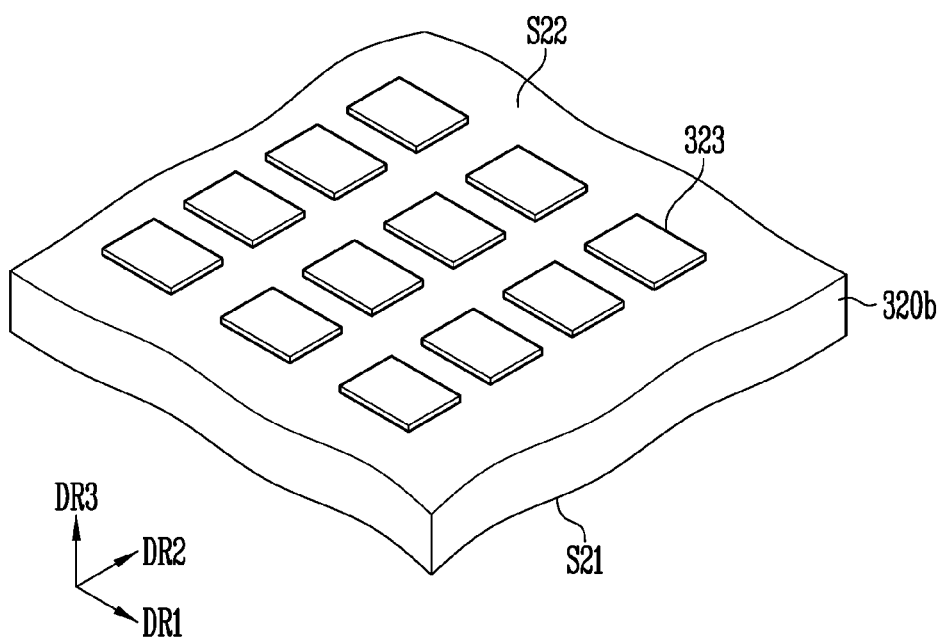
FIG. 10 is a perspective view of a second layer shown in FIG. 7.

FIG. 7 is a sectional view illustrating a moving path of light emitted from the light source array shown in FIG. 3 to advance toward the first optical layer. FIG. 8A is a rear perspective view of a first layer shown in FIG. 7. FIG. 8B is a sectional view taken along line III-III' shown in FIG. 8A. FIG. 9 is a perspective view of a reflective layer shown in FIG. 7. FIG. 10 is a perspective view of a second layer shown in FIG. 7.

Referring to FIGS. 1 to 10, the backlight unit 300 may include a light source array 310 and a first optical layer 320.

The first optical layer 320 may include a first layer 320a defining concave portions 321, a reflective layer 320c disposed on a lower surface S11 of the first layer 320a, a second layer 320b disposed on an upper surface S12 of the first layer 320a, and optical patterns 323 disposed on the second layer 320b.

The light source array 310 may include a plurality of light sources 310b and a printed circuit board 310a on which the light sources 310b are mounted. Each of the light sources 310b may be inserted into a corresponding concave portion 321 of the first layer 320a. In an exemplary embodiment of the present disclosure, one light source 310b may be inserted into one concave portion 321 of the first layer 320a. In an exemplary embodiment of the present disclosure, each of the light sources 310b may be inserted into a corresponding concave portion 321, to be surrounded by the corresponding concave portion 321. Light L1 emitted from each of the light sources 310b may be incident into the first layer 320a through a corresponding concave portion 321 of the first layer 320a.

The reflective layer 320c may be disposed between the printed circuit board 310a and the first layer 320a. As shown in FIG. 9, the reflective layer 320c may be provided in a quadrangular shape including a lower surface S31, an upper surface S32 facing the lower surface S31, and four side surfaces connected to the lower surface S31 and the upper surface S32. In an exemplary embodiment of the present disclosure, the reflective layer 320c may define opening portions OPN penetrating the upper surface S32 and the lower surface S31.

The opening portions OPN may be defined in the reflective layer 320c to correspond to the concave portions 321 of the first layer 320a. Each of the opening portions OPN may be a through hole penetrating at least one region of the reflective layer 320c. Each of the opening portions OPN may be spaced apart from adjacent opening portions OPN at a certain distance.

The first layer 320a may be disposed between the reflective layer 320c and the second layer 320b. As shown in FIGS. 8A and 8B, the first layer 320a may be provided in a quadrangular shape including the lower surface S11 in which the concave portions 321 are defined, the upper surface S12 facing the lower surface S11, and four side surfaces connected to the lower surface S11 and the upper surface S12.

In an exemplary embodiment of the present disclosure, the first layer 320a may have a thickness d which is variable depending on whether the concave portions 321 are disposed. The thickness d may mean a distance between the lower surface S11 and the lower surface S12 of the first layer 320a. In an example, the first layer 320a may have a relatively thick thickness d in a region in which the concave portions 321 are not defined, and have a relatively thin thickness d in a region in which the concave portions 321 are defined. In addition, the first layer 320a may have a thinner thickness as becoming more adjacent to the highest point of each of the concave portion 321.

The concave portions 321 may have a semi-elliptical shape recessed toward the upper surface S12 from the lower surface S11 of the first layer 320a. Specifically, referring to FIG. 8A, the concave portions 321 may have a shape of which width decreases along an upper direction (i.e., third direction DR3), but the present disclosure is not limited thereto. In some exemplary embodiments, the shape of the concave portions 321 may be variously modified.

Each of the concave portions 321 may be designed to have a size with which a corresponding light source 310b can be sufficiently inserted thereinto. Each of the concave portions 321 may be spaced apart from adjacent concave portions 321 at a certain distance. Each of the concave portions 321 may be designed to have a height h that is equal to or smaller than a half of the thickness d of the first layer 320a in a region in which the concave portions 321 are not disposed, by considering the reliability of the first layer 320a. However, the present disclosure is not limited thereto. In another exemplary embodiment, each of the concave portions 321 may be designed to have a height h that is equal to or greater than the thickness d of the first layer 320a in an area in which the concave portions 321 are not disposed. In an exemplary embodiment of the present disclosure, each of the concave portions 321 may be designed such that the ratio of its width to height is 1:1 to 10:1.

In an exemplary embodiment of the present disclosure, the first layer 320a may include light diffusion particles DFP for diffusing and/or scattering lights L1 emitted from the light sources 310b. The light diffusion particles DFP may include a transparent particle or white particle. The transparent particle may include an organic particle such as an acryl particle, styrene particle, or a silicon particle, and an inorganic particle such as synthetic silica, glass beads, or diamond. The white particle may include titanium oxide, zinc oxide, barium sulfate, calcium carbonate, magnesium carbonate, aluminum hydroxide, clay, or the like. Also, the light diffusion particles DFP may include one or mixture of two or more of the above-described transparent particles or the above-described white particles.

The light L1 emitted from each of the light sources 310b may be incident into the first layer 320a through a corresponding concave portion 321. Light L2 passing through the first layer 320a may be diffused and/or scattered by the light diffusion particles DFP. A portion of the light L2 diffused and/or scattered by the light diffusion particles DFP may advance toward the second layer 320b. In addition, another portion of the light L2 diffused and/or scattered by the light diffusion particles DFP may advance toward the reflective layer 320c. The light advancing toward the reflective layer 320c may be reflected toward the second layer 320b by the reflective layer 320c. Light L5 reflected by the reflective layer 320c is sufficiently uniformly diffused and/or scattered by the light diffusion particles DFP, to advance toward the second layer 320b.

As described above, when a corresponding light source 310b is inserted into each of the concave portions 321 defined by the first layer 320a, in general there may occur a white-spot phenomenon in which a point at which the light source 310b is located appears brighter than the other regions when the distance between the first layer 320a and the light source array 310 is short. However, in an exemplary embodiment of the present disclosure, light L1 emitted from each of the light sources 310b may be diffused and/or scattered by a corresponding concave portions 321, and be additionally diffused and/or scattered by the light diffusion particles DFP included in the first layer 320a. Therefore, the light emitted from each of the light sources 310b may be diffused and/or scattered by the corresponding concave portion 321 and the light diffusion particles DFP, to be dispersed from a point at which the light source 310b is located to the other points and to reduce the white-spot phenomenon.

Accordingly, in the exemplary embodiment of the present disclosure, it is unnecessary to increase the thickness of the first optical layer 320 so as to sufficiently uniformly diffuse the light L1 emitted from each of the light source 310b into a light irradiation region, and thus the thickness of the backlight unit 300 can be decreased. Consequently, the display device DD can be easily slimmed.

Light L3 passing through the second layer 320b may advance toward the upper surface S22 of the second layer 320b.

The second layer 320b may be provided and/or formed on the upper surface S12 of the first layer 320a. As shown in FIG. 10, the second layer 320b may be provided in a quadrangular shape including a lower surface S21, an upper surface S22 facing the lower surface 21, and four side surfaces connected to the lower surface S21 and the upper surface S22. The second layer 320b may be made of glass or silicon that has high light transmittance and excellent thermal resistance (or small influence according to temperature).

The light L3 passing through the second layer 320b may be light-guided (or totally reflected) in the second layer 320b, and be selectively emitted (L4) toward the display panel 100 by optical patterns 323. A refractive index of the second layer 320b may be greater than that of the first layer 320a. Accordingly, a total reflection phenomenon may occur when the light L2 moved in the first layer 320a is incident at a predetermined angle into the second layer 320b. The advancing direction of the light L3 light-guided (or totally reflected) in the second layer 320b may be changed by the optical patterns 323 disposed on the upper surface S22 of the second layer 320b, to be emitted to the outside of the second layer 320b.

The optical patterns 323 may be disposed on the upper surface S22 of the second layer 320b. The optical patterns 323 may allow the light L3 light-guided (or totally reflected) in the second layer 320b to be emitted (L4) to the outside of the second layer 320b.

The optical patterns 323 may be disposed on the upper surface S22 of the second layer 320b to be spaced apart from each other. In the plan view (refer FIG. 11), the optical patterns 323 may have a quadrangular shape, but the present disclosure is not limited thereto. In some exemplary embodiments, the optical patterns 323 may have a circular shape, an elliptical shape, etc.

The optical patterns 323 may include a diffusing ink material having a reflectivity of 30% or less. In an example, the diffusing ink material may include polystyrene (PS) or polymethylmethacrylate (PMMA) beads, a solvent, a PS or PMMA copolymer, and additives, but the present disclosure is not limited thereto. In some exemplary embodiments, the optical patterns 323 may include a polymer material having light transmittance. In an example, the polymer material may include polyethylene terephthalate, polyethylene naphthalate, polycarbonate, or polyethylene methacrylate, but the present disclosure is not limited thereto.

In an exemplary embodiment of the present disclosure, although the optical patterns 323 are illustrated as independent patterns that are components separate from the second layer 320b as shown in FIG. 10, the present disclosure is not limited thereto. In some exemplary embodiments, the optical patterns 323 may be integrally provided with the second layer 320b, to be considered as one region of the second layer 320b.

The optical patterns 323 may have the same size, but the present disclosure is not limited thereto. In some exemplary embodiments, the optical patterns 323 may have different sizes from each other. Also, each of the optical patterns 323 may be spaced apart from adjacent optical patterns 323 at different distances. This will be described in detail later with reference to FIG. 11.

In an exemplary embodiment of the present disclosure, the reflective layer 320c, the first layer 320a, and the second layer 320b may all constitute the first optical layer 320 in a state in which they are integrally laminated.

An interlayer CTL may be disposed between the first layer 320a and the second layer 320b. The interlayer CTL may be disposed on the upper surface S12 of the first layer 320a, to couple the second layer 320b and the first layer 320a to each other. The interlayer CTL may have an adhesive or gluing property so as to perform a bonding function. In an example, the interlayer CTL may be made of an optically clear adhesive (OCA) as an adhesive material having light transmittance, but the present disclosure is not limited thereto. In some exemplary embodiments, the interlayer CTL may be made of a pressure sensitive adhesive ("PSA") in which an adhesive material acts when pressure for allowing the interlayer CTL to be adhered to an adhesive surface is applied.

Figure 11:
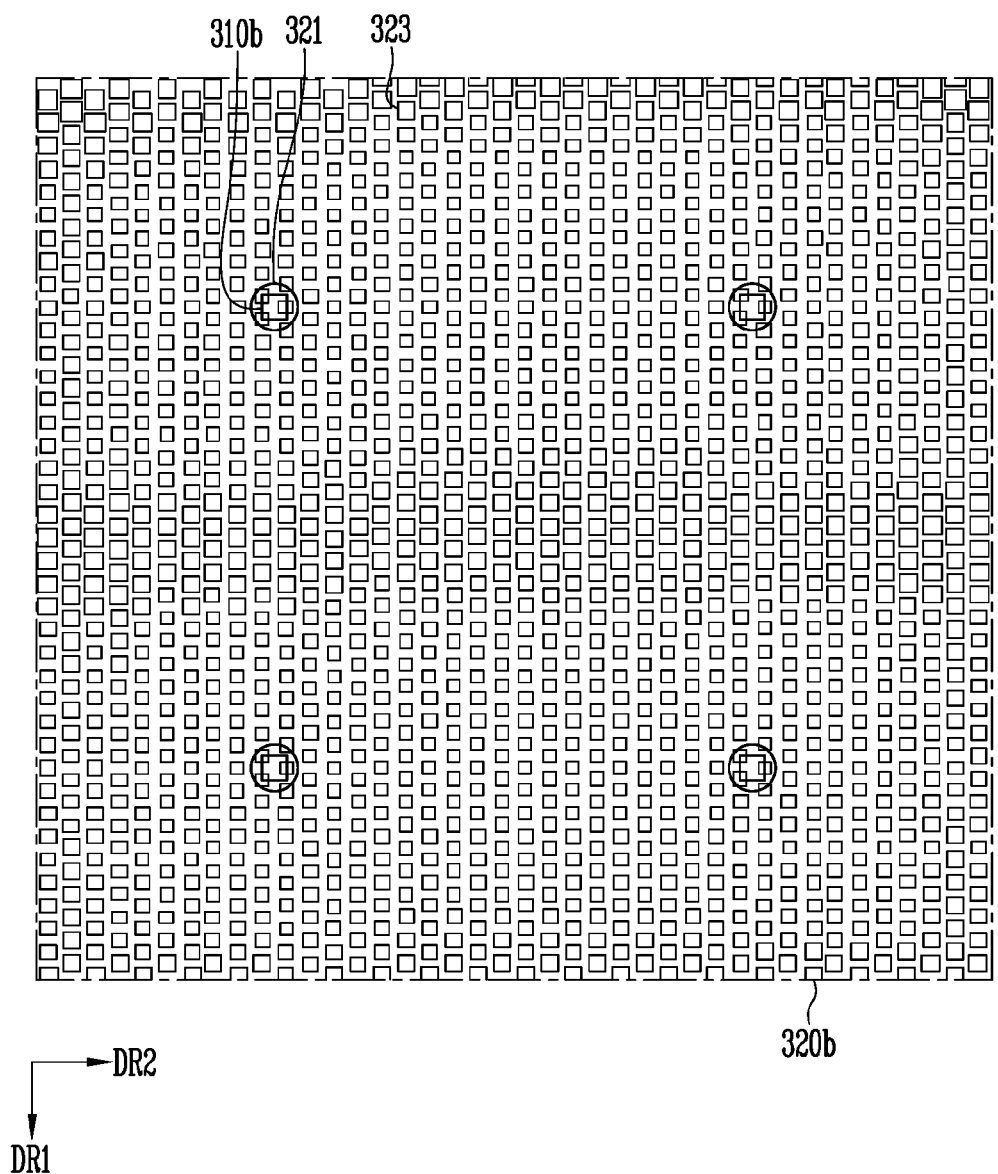
FIG. 11 is a plan view schematically illustrating an arrangement structure of light sources and optical patterns, which are shown in FIG. 7.

FIG. 11 is a plan view schematically illustrating an arrangement structure of the light sources and optical patterns, which are shown in FIG. 7. In FIG. 11, a case where four light sources 310b each inserted into a corresponding concave portion 321 in at least one region of the second layer 320b is illustrated.

Referring to FIGS. 1 to 11, optical patterns 323 may be arranged on the upper surface S22 of the second layer 320b.

Lights emitted from the light sources 310b may be concentrated on at least one region of the upper surface S22 of the second layer 320b, which corresponds to the light source 310b or overlaps with the light sources 310b, as compared with a region that does not correspond to the light sources 310b (or a region that does not overlap with the light sources 310b). Therefore, a difference in amount (or intensity) of light between the at least one region of the upper surface S22 of the second layer 320b and the other regions may occur since light in the at least one region of the upper surface S22 of the second layer 320b appears brighter than that in the other regions.

Accordingly, in an exemplary embodiment of the present disclosure, the optical patterns 323 may be disposed at different densities (or concentrations) on the upper surface S22 of the second layer 320b so as to reduce the difference in amount (or intensity) of light between regions. In an example, the optical patterns 323 may be disposed such that the distance of each of the optical patterns 323 from an adjacent optical pattern 323 decreases as the optical pattern 323 is more distant from the region of the upper surface S22 of the second layer 320b, which corresponds to each of the light sources 310b.

Optical patterns 323 disposed in the region of the upper surface S22 of the second layer 320b, which corresponds to each of the light sources 310b, may have a relatively wide distance from the adjacent optical pattern 323 in the first and second directions DR1 and DR2. In the plan view (refer FIG. 11), optical patterns 323 disposed in the region of the upper surface S22 of the second layer 320b, which corresponds to each of the light sources 310b, may mean a region of optical patterns 323 that overlap with the light source 310b or disposed very adjacent to the light source 310b.

In addition, optical patterns 323 disposed most distant from the region of the upper surface S22 of the second layer 320b, which corresponds to each of the light sources 310b, may have relatively narrow distances from adjacent optical patterns 323 in the first and second directions DR1 and DR2. In the plan view (refer FIG. 11), optical patterns 323 disposed most distant from the region of the upper surface S22 of the second layer 320b, which corresponds to each of the light sources 310b, may be optical patterns 323 located in an intermediate region between two light sources 310b on the same row or the same column.

As described above, since the optical patterns 323 are disposed such that the distance of each of the optical patterns 323 from the adjacent optical pattern 323 decreases as the optical pattern 323 is more distant from the region of the upper surface S22 of the second layer 320b, which corresponds to each of the light sources 310b, a density of optical patterns 323 disposed in a region most distant from the light sources 310b may be higher than that of optical patterns 323 disposed in a region most adjacent to the light sources 310b, in the plan view (refer FIG. 11).

When light guided or totally reflected in the second layer 320b is selectively emitted to the outside of the second layer 320b by the optical patterns 323, the radiated light may be emitted with an equal amount (or intensity) from a region in which the density of the optical patterns 323 is low and a region in which the density of the optical patterns 323 is high. That is, when the optical patterns 323 are disposed that the density of the optical patterns 323 is different depending on regions, uniform light can be emitted throughout all the regions of the second layer 320b.

In some exemplary embodiments, the optical patterns 323 may have different sizes from each other. In an example, in the plan view (refer FIG. 11), the optical patterns 323 may be designed to have a size that increases as the optical patterns 323 are more distant from each of the light sources 310b and to have a size that decreases as the optical patterns 323 are more adjacent to each of the light sources 310b. Accordingly, optical patterns 323 having a relatively large size may be disposed in a region of the upper surface S22 of the second layer 320b, which is distant from each of the light sources 310b, as compared with a region of the upper surface S22 of the second layer 320b, which is adjacent to each of the light sources 310b.

The frequency at which the advancing direction of light guided or totally reflected in the second layer 320b is changed by optical patterns 323 having a relatively large size may be increased as compared with optical patterns 323 having a relatively small size. In a region of the upper layer S22 of the second layer 320b, in which optical patterns 323 having a relatively large size are disposed, a large amount of light may be emitted to the outside of the second layer 320b, as compared with the other regions, e.g., a region of the upper layer S22 of the second layer 320b, in which optical patterns 323 having a relatively small size are disposed. Thus, when the optical patterns 323 are designed to have different sizes depending on regions, uniform light can be emitted throughout all the regions of the second layer 320b.

In the above-described exemplary embodiment, although a case where the optical patterns 323 have different sizes depending on regions is described, the present disclosure is not limited thereto. In some exemplary embodiments, the optical patterns 323 may be disposed to have the same size regardless of regions but to have different densities depending on the regions of the upper surface S22 of the second layer 320b.

The above-described optical patterns 323 are to finally provide light having an equal amount (or intensity) uniformly to all the regions of the display panel 100. Therefore, the optical patterns 323 may be disposed with various sizes and/or at various densities per unit area according to positions of the light sources 310b. For example, when there exist a region on which light is concentrated since the region corresponds to each of the light sources 310b and a region on which the light is not concentrated since the region is spaced apart from each of the light sources 310b at a certain distance, a large number of optical patterns 323 may be disposed in the region on which the light is not concentrated, and a smaller number of optical patterns 323 may be disposed in the region on which the light is concentrated, so as to increase a light emission distribution of the region on which the light is not concentrated.

As described above, the number of optical patterns 323 for each region may vary depending on an effect to be implemented.

Figure 12A:
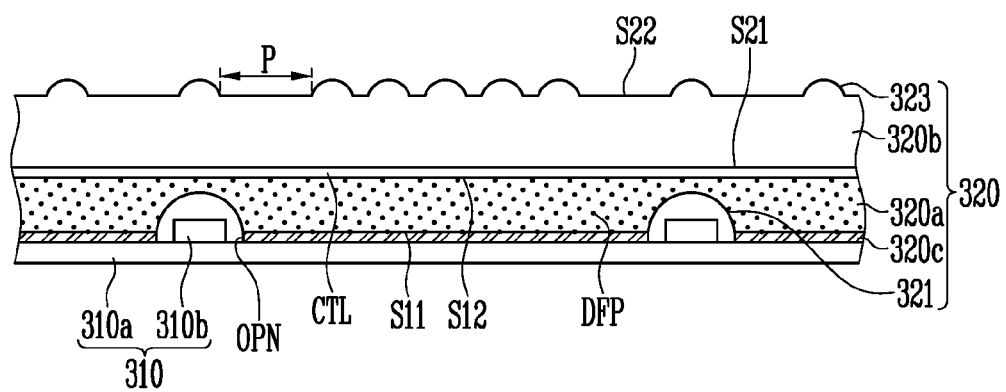
FIG. 12A is a sectional view illustrating an arrangement relationship of a first optical layer including a second layer and the light source array in accordance with another exemplary embodiment of the present disclosure.
Figure 12B:
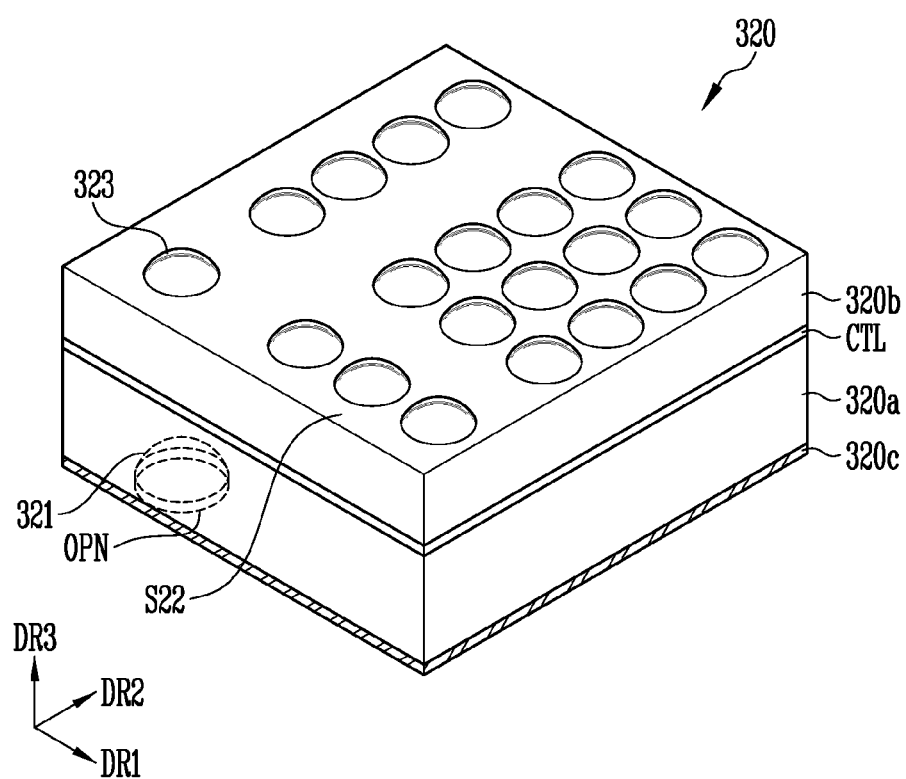
FIG. 12B is a perspective view illustrating a portion of the first optical layer including the second layer shown in FIG. 12A.

FIG. 12A is a sectional view illustrating an arrangement relationship of a first optical layer including a second layer and the light source array in accordance with another exemplary embodiment of the present disclosure. FIG. 12B is a perspective view illustrating a portion of the first optical layer including the second layer shown in FIG. 12A.

The first optical layer shown in FIGS. 12A and 12B may have a configuration substantially identical or similar to the first optical layer shown in FIG. 7, except that optical patterns 323 are integrally provided with the second layer 320b.

Accordingly, in relation to the first optical layer shown in FIGS. 12A and 12B, differences from the above-described exemplary embodiment will be mainly described to avoid redundancy. Portions not particularly described in this exemplary embodiment follow those of the above-described exemplary embodiment. In addition, identical reference numerals refer to identical components, and similar reference numerals refer to similar components.

Referring to FIGS. 1 to 6, 12A, and 12B, each of the light sources 310b mounted on the printed circuit board 310a may be inserted into one concave portion 321 among the concave portions 321 defined by the first layer 320a. In an example, the light sources 310b may be inserted into the concave portions 321, respectively.

The second layer 320b may be provided and/or formed on the first layer 320a, and the reflective layer 320c including the opening portions OPN may be provided and/or formed on the bottom of the first layer 320a. In an exemplary embodiment of the present disclosure, the reflective layer 320c, the first layer 320a, and the second layer 320b may all constitute the first optical layer 320 in a state in which they are integrally laminated.

The optical patterns 323 may be disposed on the upper surface S22 of the second layer 320b. In an exemplary embodiment of the present disclosure, the optical patterns 323 may be integrally provided with the second layer 320b. When the optical patterns 323 are integrally provided with the upper surface S22 of the second layer 320b, at least one region of the upper surface S22 may include an uneven surface.

The optical patterns 323 may have a shape protruding upward from the upper surface S22 of the second layer 320b. In an example, in the sectional view, the optical patterns 323 may have a semi-elliptical shape, a lens shape, an embossed shape, or the like, of which width decreases toward an upper direction. The optical patterns 323 may have the same size. As described above, when the optical patterns 323 have a shape protruding toward the upper portion from the upper surface S22 of the second layer 320b, at least one region of the upper surface S22 of the second layer 320b may have a winding surface, e.g., an uneven surface.

When the optical patterns 323 are integrally provided with the second layer 320b, the optical patterns 323 and the second layer 320b may include the same material. The optical patterns 323 may be designed to have a shape protruding toward the upper portion from the upper surface S22 of the second layer 320b through a process known in the art, such as an injection molding process.

In an exemplary embodiment of the present disclosure, the density of optical patterns 323 may be higher as the optical patterns 323 are more distant from the region of the upper surface S22 of the second layer 320b, which corresponds to each of the light sources 310b, and be lower as the optical patterns 323 are closer to the region. A distance P of each of the optical patterns 323 from an adjacent optical pattern 323 decreases as the optical pattern 323 is more distant from the region of the upper surface S22 of the second layer 320b, which corresponds to each of the light sources 310b. This is for the purpose of allowing an amount of light emitted to the outside of the second layer 320b to be uniform throughout all the regions of the second layer 320b.

Figure 13:
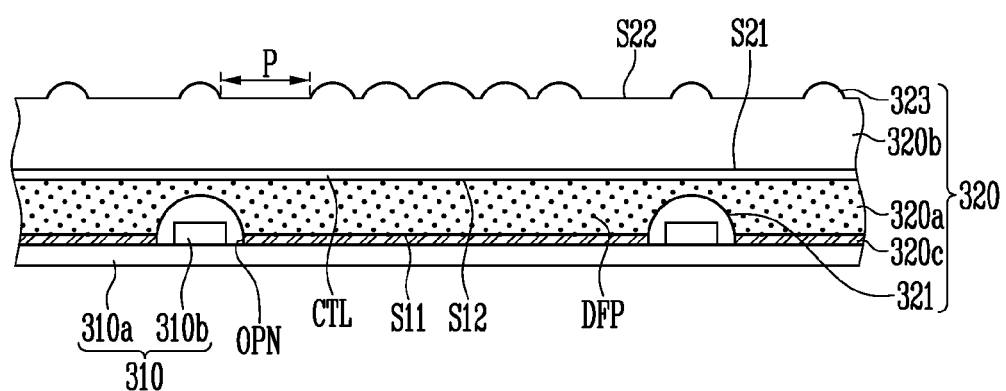
FIG. 13 is a sectional view illustrating another exemplary embodiment of optical patterns shown in FIG. 12A.

FIG. 13 is a sectional view illustrating another exemplary embodiment of the optical patterns shown in FIG. 12A.

Referring to FIGS. 1 to 6 and 13, the second layer 320b may include optical patterns 323. The optical patterns 323 may be integrally provided with the second layer 320b. The optical patterns 323 may have a shape protruding toward an upper portion from the upper surface S22 of the second layer 320b.

In an exemplary embodiment of the present disclosure, the optical patterns 323 may have different sizes from each other. In an example, the optical patterns 323 may be designed to have a size that decreases as the optical patterns 323 are more adjacent to the region of the upper surface S22 of the second layer 320b, which corresponds to each of the light sources 310b, and to have a size that increases as the optical patterns 323 become more distant from the region. Also, the optical patterns 323 may be designed to have a distance P of each of the optical patterns 323 from an adjacent optical pattern 323, which decreases as the optical pattern 323 is more distant from the region of the upper surface S22 of the second layer 320b, which corresponds to each of the light sources 310b.

Figure 14A:
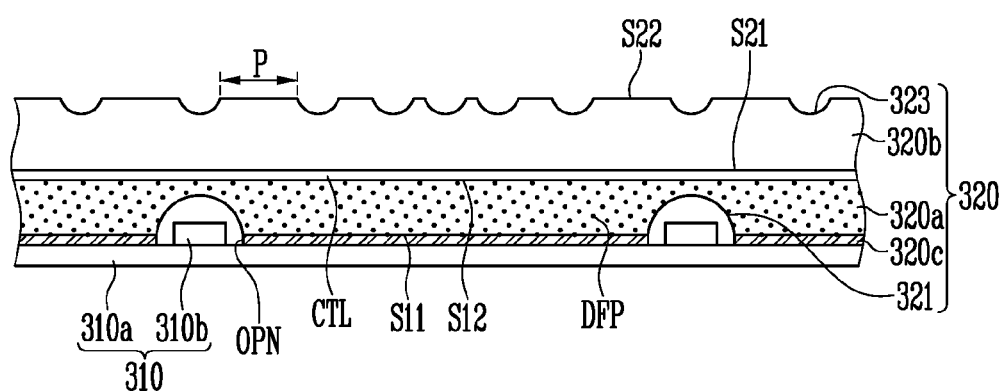
FIG. 14A is a sectional view illustrating an arrangement relationship of a first optical layer including a second layer and the light source array in accordance with still another exemplary embodiment of the present disclosure.
Figure 14B:
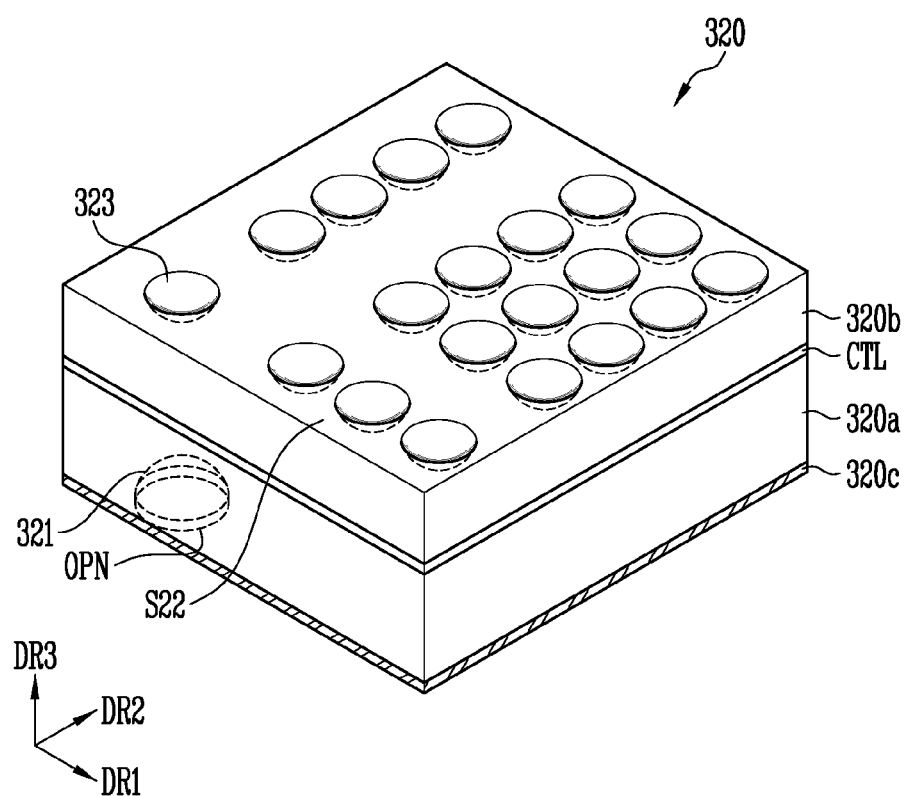
FIG. 14B is a perspective view illustrating a portion of the first optical layer including the second layer shown in FIG. 14A.

FIG. 14A is a sectional view illustrating an arrangement relationship of a first optical layer including a second layer and a light source array in accordance with still another exemplary embodiment of the present disclosure. FIG. 14B is a perspective view illustrating a portion of the first optical layer including the second layer shown in FIG. 14A.

The first optical layer 320 shown in FIGS. 14A and 14B may have a configuration substantially identical or similar to the first optical layer shown in FIG. 7, except that optical patterns 323 have a shape recessed toward a lower portion from the upper surface S22 of the second layer 320b.

In relation to the first optical layer shown in FIGS. 14A and 14B, differences from the above-described exemplary embodiment will be mainly described to avoid redundancy. Portions not particularly described in this exemplary embodiment follow those of the above-described exemplary embodiment. In addition, identical reference numerals refer to identical components, and similar reference numerals refer to similar components.

Referring to FIGS. 1 to 6, 14A, and 14B, the first optical layer 320 may include a first layer 320a defining concave portions 321, a second layer 320b that is provided on the first layer 320a and defines optical patterns 323, and a reflective layer 320c defining opening portions OPN.

The reflective layer 320c, the first layer 320a, and the second layer 320b, which are sequentially stacked, may all constitute the first optical layer 320 in a state in which they are integrally laminated.

In an exemplary embodiment of the present disclosure, the optical patterns 323 may be integrally provided with an upper surface S22 of the second layer 320b. When the optical patterns 323 are integrally provided with the upper surface S22 of the second layer 320b, at least one region of the upper surface S22 may include an uneven surface. The optical patterns 323 may have the same size.

The optical patterns 323 may have a shape recessed toward a lower portion from the upper surface S22 of the second layer 320b. In an example, in a sectional view, the optical patterns 323 may have a semi-elliptical shape or the like, of which width decreases toward a lower direction. The optical patterns 323 may be designed to have a shape recessed toward the lower portion from the upper surface S22 of the second layer 320b through a process known in the art, such as a stamping process or a process using laser.

In an exemplary embodiment of the present disclosure, a distance P of each of the optical patterns 323 from an adjacent optical pattern 323 may decrease as the optical pattern 323 is more distant from the region of the upper surface S22 of the second layer 320b, which corresponds to each of the light sources 310b.

Figure 15:
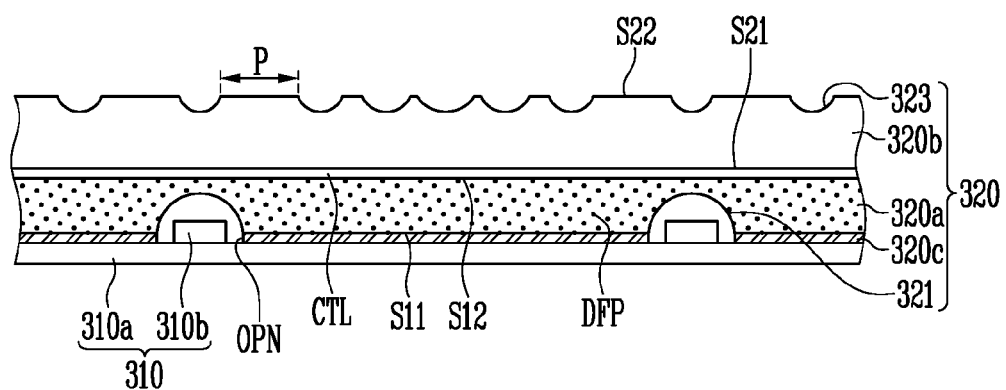
FIG. 15 is a sectional view illustrating another exemplary embodiment of optical patterns shown in FIG. 14A.

FIG. 15 is a sectional view illustrating another exemplary embodiment of the optical patterns shown in FIG. 14A.

Referring to FIGS. 1 to 6 and 15, the second layer 320b may include optical patterns 323 integrally provided therewith. The optical patterns 323 may have a shape recessed toward a lower portion from the upper surface S22 of the second layer 320b.

In an exemplary embodiment of the present disclosure, the optical patterns 323 may have different sizes from each other. In an example, the optical patterns 323 may be designed to have a size that decreases as the optical patterns 323 are more adjacent to the region of the upper surface S22 of the second layer 320b, which corresponds to each of the light sources 310b, and to have a size that increases as the optical patterns 323 become more distant from the region. Also, the optical patterns 323 may be designed to have a distance P of each of the optical patterns 323 from an adjacent optical pattern 323, which decreases as the optical pattern 323 is more distant from the region of the upper surface S22 of the second layer 320b, which corresponds to each of the light sources 310b.

As described above, in accordance with the exemplary embodiment of the present disclosure, a corresponding light source 310b is inserted into each of the concave portions 321 of the first layer 320a, so that the backlight unit 300 can be easily slimmed.

Also, in accordance with the exemplary embodiment of the present disclosure, light emitted from each of the light sources 310b can be diffused and/or scattered, by light diffusion particles DFP included in the first layer 320a, into the other regions from a point at which the light source 310b is located. Accordingly, lights emitted from the light sources 310b can sufficiently uniformly advance equally toward all regions of the second layer 320b.

Also, in accordance with the exemplary embodiment of the present disclosure, the density of the optical patterns 323 disposed on the upper surface S22 of the second layer 320b varies depending on regions, so that an amount (or intensity) of light emitted to the outside of the second layer 320b can be uniform throughout all the regions of the second layer 320b.

Also, in accordance with the exemplary embodiment of the present disclosure, the first optical layer 320 is provided by integrally forming the first layer 320a with the second layer 320b made of glass or silicon that has excellent thermal resistance (or small influence according to temperature), so that the reliability of the backlight unit 300 can be further improved.

Figure 16:
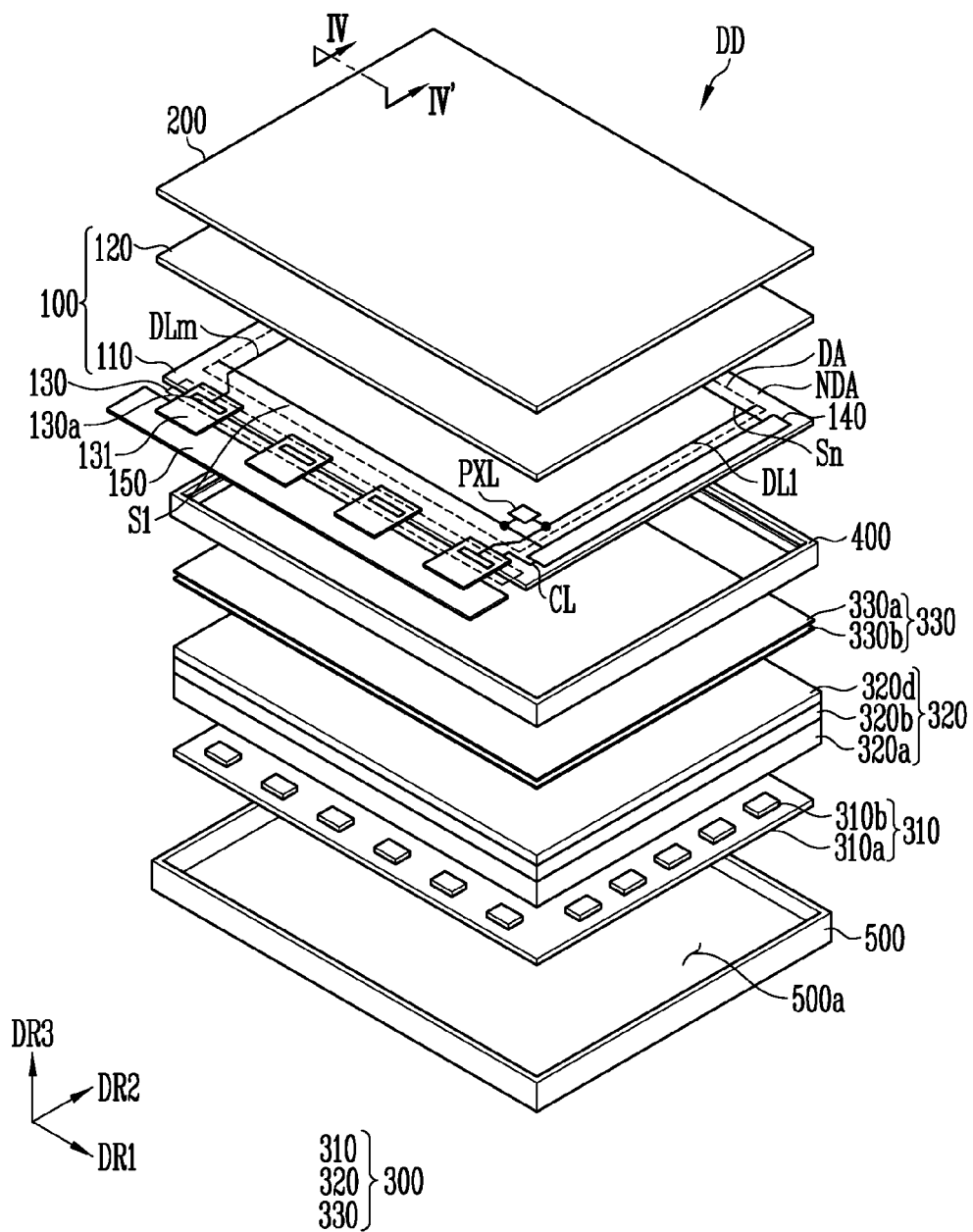
FIG. 16 is an exploded perspective view illustrating a display device in accordance with another exemplary embodiment of the present disclosure.
Figure 17:
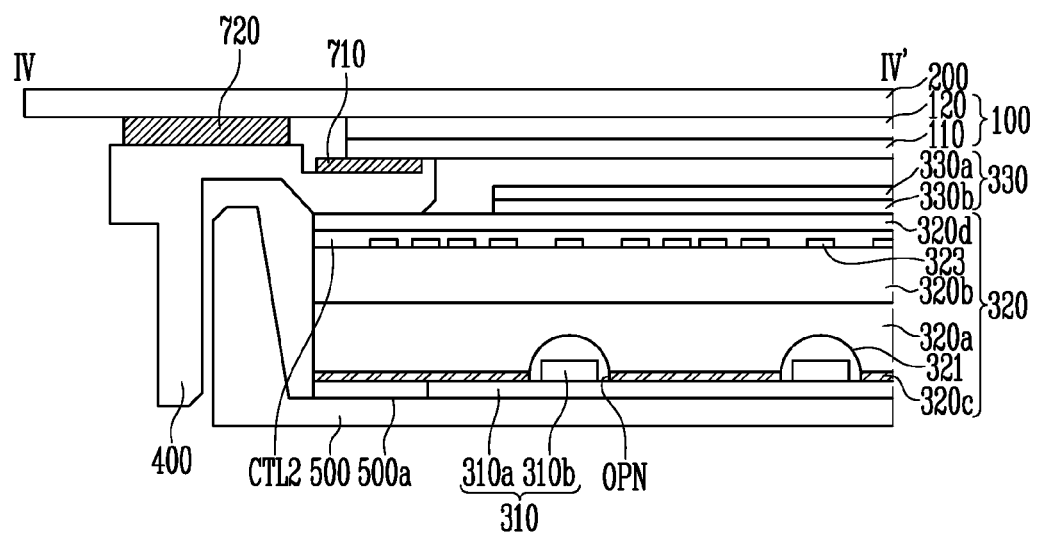
FIG. 17 is a sectional view taken along line IV-IV' shown in FIG. 16.
Figure 18:
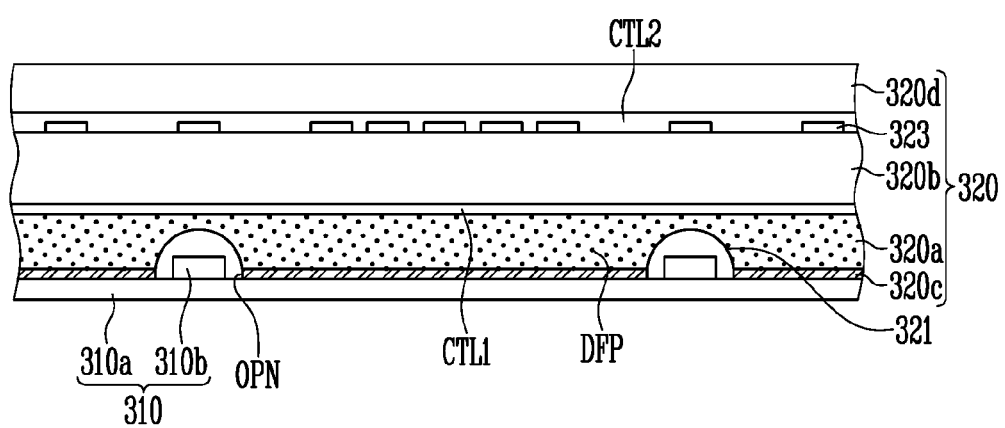
FIG. 18 is a sectional view illustrating portions of a light source array and a first optical layer, which are shown in FIG. 17.

FIG. 16 is an exploded perspective view illustrating a display device in accordance with another exemplary embodiment of the present disclosure. FIG. 17 is a sectional view taken along line IV-IV' shown in FIG. 16. FIG. 18 is a sectional view illustrating portions of a light source array and a first optical layer, which are shown in FIG. 17.

The display device shown in FIGS. 16 to 18 may have a configuration substantially identical or similar to the display device shown in FIGS. 2 and 3, except that a first optical layer further includes a sub-layer.

Accordingly, in relation to the display device shown in FIGS. 16 to 18, differences from the above-described exemplary embodiment will be mainly described to avoid redundancy. Portions not particularly described in this exemplary embodiment follow those of the above-described exemplary embodiment. In addition, identical reference numerals refer to identical components, and similar reference numerals refer to similar components.

Referring to FIGS. 1 and 16 to 18, the display device DD in accordance with the another exemplary embodiment of the present disclosure may include a display panel 100, a scan driver 140, a data driver 130, a driving circuit board 150, a touch sensor 200, a backlight unit 300, a mold frame 400, and a housing 500.

The backlight unit 300 may include a light source array 310, a first optical layer 320, and a second optical layer 330.

The light source array 310 may include a printed circuit board 310a and a plurality of light sources 310b.

The first optical layer 320 may include a first layer 320a, a second layer 320b, a reflective layer 320c, and a sub-layer 320d.

The first layer 320a may be a diffusion member that allows lights emitted from the light sources 310b to advance into the second layer 320b by diffusing and/or scattering the lights. The first layer 320a may define a plurality of concave portions 321, and include light diffusion particles DFP therein. One light source 310b may be inserted into each of the concave portions 321.

The reflective layer 320c may be provided and/or formed between the first layer 320a and the printed circuit board 310a. The reflective layer 320c may define a plurality of opening portions OPN. Each of the opening portions OPN may be a through hole penetrating at least one region of the reflective layer 320c. The opening portions OPN may be disposed at positions corresponding to the concave portions 321 defined by the first layer 320a. The opening portions OPN may be provided in the same number as the concave portions 321.

The second layer 320b may be provided and/or formed between the first layer 320a and the sub-layer 320d. The second layer 320b may be a light guide member that guides light incident from the first layer 320a toward the display panel 100.

Optical patterns 323 may be provided and/or formed on an upper surface of the second layer 320b. Each of the optical patterns 323 may be a light emission pattern that selectively emits light guided in the second layer 320b (or totally reflected) toward the display panel 100. The optical patterns 323 may be integrally provided with the second layer 320b, to be considered as one region of the second layer 320b. In some exemplary embodiments, the optical patterns 323 may be separate independent patterns provided and/or formed on the second layer 320b through a printing process, etc.

Each of the optical patterns 323 may be spaced apart from adjacent optical patterns 323 at different distances on the upper surface of the second layer 320b. In an example, in a plan view, a distance between one optical pattern 323 overlapping with each of the light source 310b and an optical pattern 323 adjacent thereto may be wider than that between one optical pattern 323 that does not overlap with the light source 310b and an optical pattern 323 adjacent thereto. Accordingly, optical patterns 323 may be concentratedly disposed in one region of the upper surface of the second layer 320b, which does not overlap with each of the light sources 310b. The optical patterns 323 may be disposed to have different densities depending on regions of the upper surface of the second layer 320b.

In general, an intensity (or amount) of light emitted from one region of the second layer 320b, which overlaps with each of the light sources 310b is stronger than that of light emitted from any other region (e.g., a region that does not overlap with the light source 310b). Hence, optical patterns 323 are concentratedly disposed in the other region, so that the intensity (or amount) of light emitted from the other region through the optical patterns 323 can be increased. Therefore, light having a uniform intensity (or amount) is radiated to the outside of the second layer 320b throughout all the regions of the second layer 320b, to be provided to the display panel 100.

A first interlayer CTL1 may be provided and/or formed between the first layer 320a and the second layer 320b. The first interlayer CTL1 may be provided on an upper surface of the first layer 320a, to couple the second layer 320b and the first layer 320a to each other. The first interlayer CTL1 may be made of an optically clear adhesive (OCA) as an adhesive material having light transmittance. In some exemplary embodiments, the first interlayer CTL1 may be made of a pressure sensitive adhesive (PSA).

In an exemplary embodiment of the present disclosure, the sub-layer 320d may be made of a transparent material having a light transmittance of about 20% to about 80%. In an example, the transparent material may include at least one of a polycarbonate (PC) based material, a polystyrene (PS) based material, and a silicon-based material. The sub-layer 320d may include the same material as the first layer 320a, but the present disclosure is not limited thereto.

A second interlayer CTL2 may be provided and/or formed between the second layer 320b and the sub-layer 320d. The second interlayer CTL2 may be provided on the upper surface of the second layer 320b and the optical patterns 323 to couple the sub-layer 320d and the second layer 320b to each other. The second interlayer CTL2 may be made of the same material as the first interlayer CTL1. In an example, the second interlayer CTL2 may be made of an optically clear adhesive (OCA).

In an exemplary embodiment of the present disclosure, the reflective layer 320c, the first layer 320a, the second layer 320b, and the sub-layer 320d may all constitute the first optical layer 320 in a state in which they are integrally laminated.

The second optical layer 330 may be provided and/or formed between the first optical layer 320 and the display panel 100, to function to control light that is emitted from the light source array 310 and then radiated through the first optical layer 320. The second optical layer 330 may include a light condensing sheet 330b and a protective sheet 330a, which are sequentially stacked.

The light condensing sheet 330b may be provided and/or formed between the sub-layer 320d of the first optical layer 320 and the protective sheet 330a, to condense light emitted and diffused from the sub-layer 320d in a direction perpendicular to a plane of the display panel 100 that is disposed on the top thereof. Most of lights passing through the light condensing sheet 330b may be perpendicularly incident into the display panel 100.

The protective sheet 330a may be provided and/or formed between the light condensing sheet 330b and the display panel 100. The protective sheet 330a may be a protective sheet that protects the light condensing sheet 330b from external impact.

As described above, the first optical layer 320 includes the sub-layer 320d that diffuses light emitted to the outside of the second layer 320b, and hence the second optical layer 330 may not be provided with a separate diffusion member. Accordingly, the thickness of the second optical layer 330 is decreased, so that the backlight unit 300 can be more easily slimmed.

Figure 19:
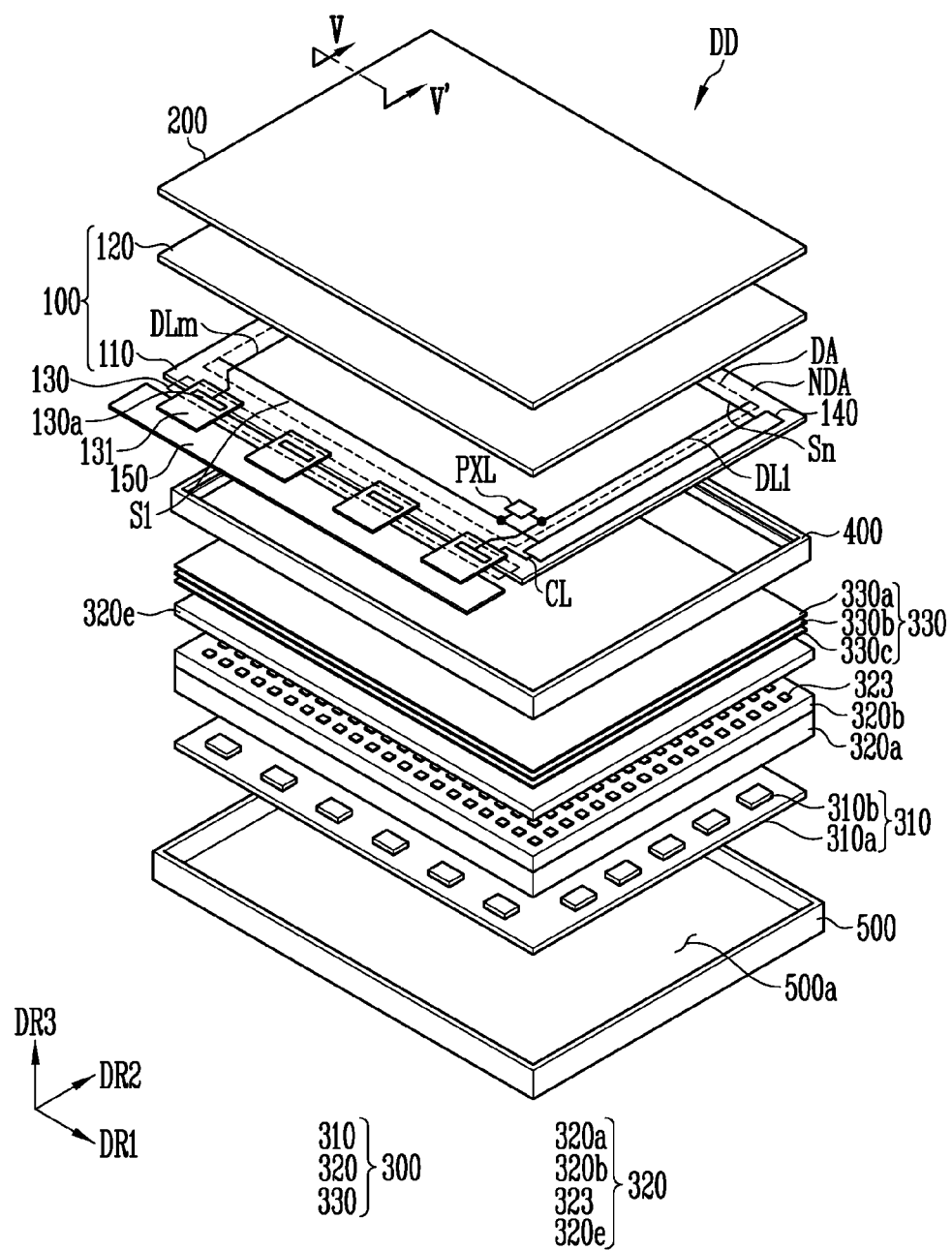
FIG. 19 is an exploded perspective view illustrating a display device in accordance with still another exemplary embodiment of the present disclosure.
Figure 20:
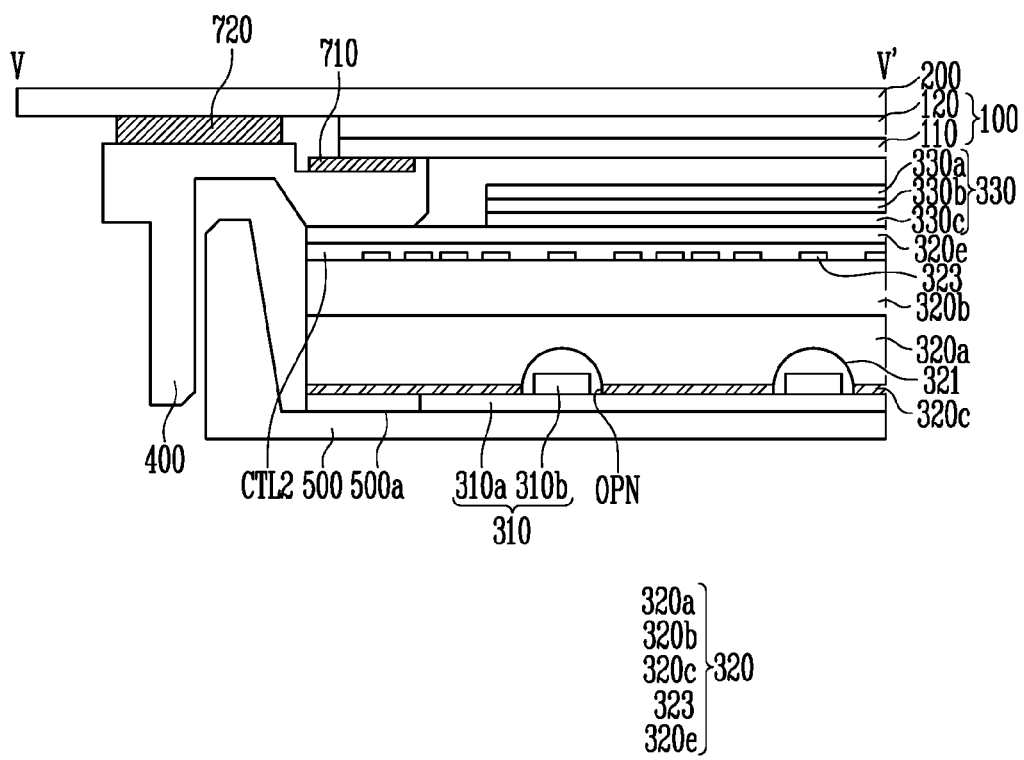
FIG. 20 is a sectional view taken along line V-V' shown in FIG. 19.
Figure 21A:
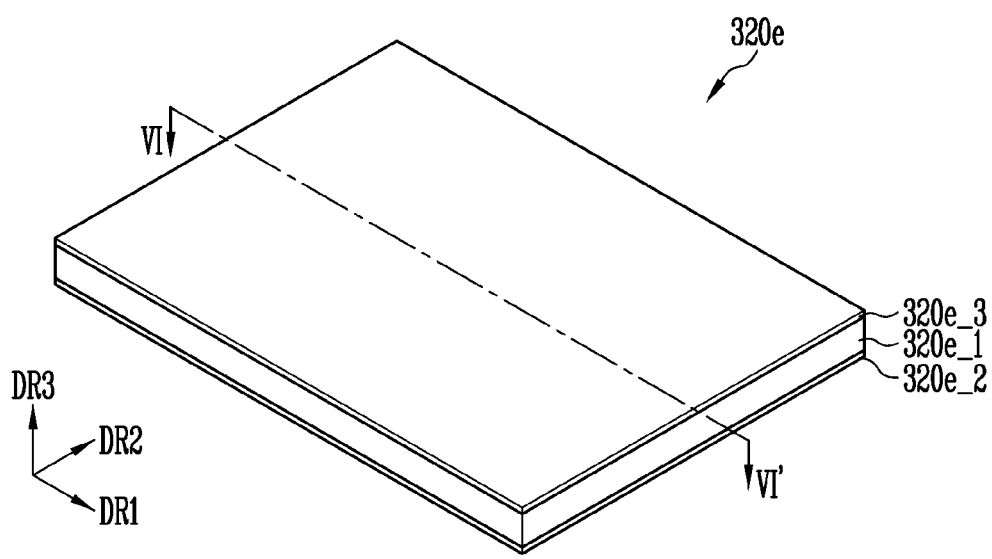
FIG. 21A is a perspective view illustrating a color conversion layer shown in FIG. 19.
Figure 21B:
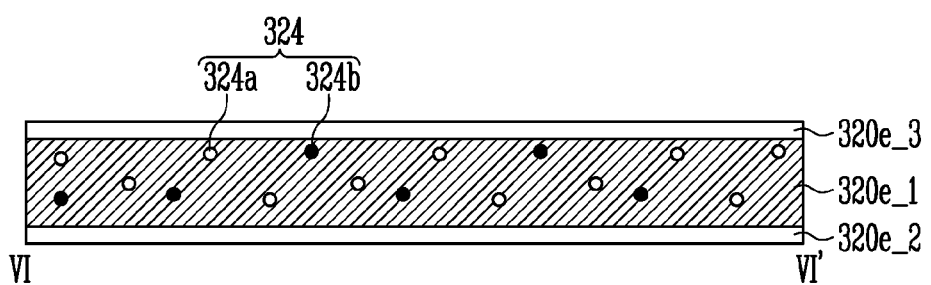
FIG. 21B is a sectional view taken along line VI-VI' shown in FIG. 21A.
Figure 22:
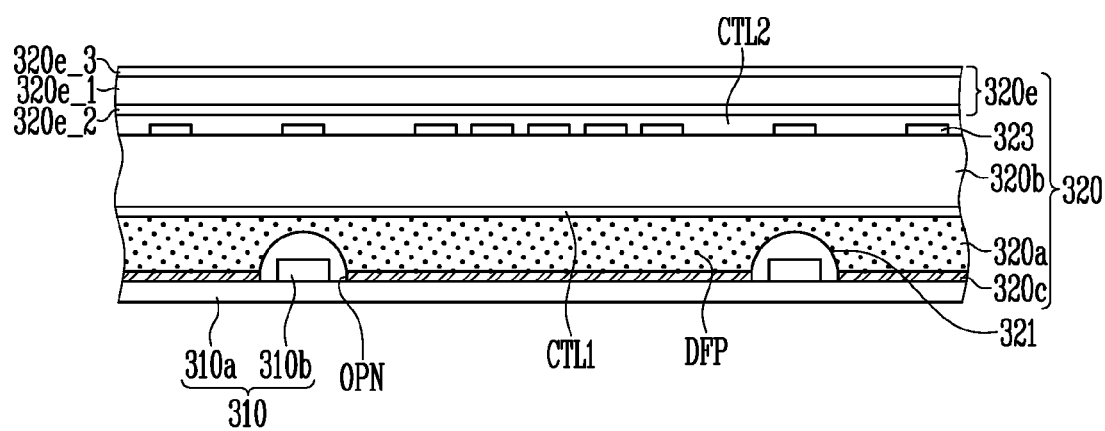
FIG. 22 is a sectional view illustrating portions of a light source array and a first optical layer, which are shown in FIG. 20.

FIG. 19 is an exploded perspective view illustrating a display device in accordance with still another exemplary embodiment of the present disclosure. FIG. 20 is a sectional view taken along line V-V' shown in FIG. 19. FIG. 21A is a perspective view illustrating a color conversion layer shown in FIG. 19. FIG. 21B is a sectional view taken along line VI-VI' shown in FIG. 21A. FIG. 22 is a sectional view illustrating portions of a light source array and a first optical layer, which are shown in FIG. 20.

The display device shown in FIGS. 19 to 22 may have a configuration substantially identical or similar to the display device shown in FIGS. 2 and 3, except that a first optical layer further includes a color conversion layer.

Accordingly, in relation to the display device shown in FIGS. 19 to 22, differences from the above-described exemplary embodiment will be mainly described to avoid redundancy. Portions not particularly described in this exemplary embodiment follow those of the above-described exemplary embodiment. In addition, identical reference numerals refer to identical components, and similar reference numerals refer to similar components.

Referring to FIGS. 1 and 19 to 22, the display device DD in accordance with the still another exemplary embodiment of the present disclosure may include a display panel 100, a scan driver 140, a data driver 130, a driving circuit board 150, a touch sensor 200, a backlight unit 300, a mold frame 400, and a housing 500.

The backlight unit 300 may include a light source array 310, a first optical layer 320, and a second optical layer 330.

The light source array 310 may include a printed circuit board 310a and a plurality of light sources 310b.

The first optical layer 320 may include a first layer 320a, a second layer 320b, and a color conversion layer 320e.

The first layer 320a may define a plurality of concave portions 321 in the lower surface S11 thereof, and include light diffusion particles DFP therein. One light source 310b may be inserted into each of the concave portions 321.

The reflective layer 320c may be provided and/or formed between the first layer 320a and the printed circuit board 310a. The reflective layer 320c may define a plurality of opening portions OPN.

The second layer 320b may be provided and/or formed between the first layer 320a and the color conversion layer 320e. Optical patterns 323 may be provided and/or formed on an upper surface of the second layer 320b.

The first layer 320a and the second layer 320b may be coupled to each other through a first interlayer CTL1. The first interlayer CTL1 may be made of an optically clear adhesive (OCA) as an adhesive material having light transmittance. In some exemplary embodiments, the first interlayer CTL1 may be made of a pressure sensitive adhesive (PSA).

The color conversion layer 320e may be provided and/or formed between the second layer 320b and the second optical layer 330. The color conversion layer 320e may convert light emitted to the outside of the second layer 320b into light of a specific color and emit the converted light. In an example, when the light sources 310b emit blue light, the color conversion layer 320e may convert the blue light into white light and emits the white light. The white light emitted from the color conversion layer 320e may be provided to the display panel 100. In an exemplary embodiment of the present disclosure, the color conversion layer 320e may be configured in a form in which at least one kind of light conversion particles 324 are dispersed in a transparent resin.

In an exemplary embodiment of the present disclosure, the color conversion layer 320e may include a quantum dot layer 320e_1 and first and second protective layers 320e_2 and 320e_3.

The first and second protective layers 320e_2 and 320e_3 may function to maintain the shape of the quantum dot layer 320e_1 and to protect damage of the quantum dot layer 320e_1 from an external force. The first and second protective layers 320e_2 and 320e_3 may include polymers such as polyethylene terephthalate ("PET"), silicon oxide, titanium oxide, aluminum oxide, or suitable combinations thereof. The first and second protective layers 320e_2 and 320e_3 may have a thickness of about 50 μm, but the present disclosure is not limited thereto.

The first and second protective layers 320e_2 and 320e_3 may have low oxygen permeability and low moisture permeability. Thus, the first and second protective layers 320e_2 and 320e_3 can protect the quantum dot layer 320e_1 from external chemical impact such as moisture and/or oxygen.

The quantum dot layer 320e_1 may be provided in a form in which at least one kind of light conversion particles 324 are dispersed in a base layer. In an exemplary embodiment of the present disclosure, the base layer may be a transparent resin.

The light conversion particles 324 may mean particles having a predetermined size, which have a quantum confinement effect. The light conversion particles 324 may be quantum dots.

The quantum dot has various properties that other materials do not have. First, the quantum dot may generate strong fluorescence in a narrow wavelength band. Light emitted by the quantum dot may be generated while an electron in an unstable (or excited) state is falling from a conduction band to a valence band. The generated fluorescence has a special property that light having a shorter wavelength is generated as the size of the quantum dot is smaller and light having a longer wavelength is generated as the size of the quantum dot is larger. Thus, the size of the quantum dot is adjusted, so that all lights in a visible region of a desired wavelength can be emitted.

The light conversion particles 324 are semiconductor crystals having a few nanometers (nm) size, which are made through a chemical synthesis process, and converts the wavelength of light emitted from each of the light sources 310b and then emits the converted light. Since the wavelength of the emitted light varies depending on the size of the light conversion particles 324, lights of all colors in the visible ray can be emitted. The diameter of the light conversion particles 324 may be within a range of 1 nm to 10 nm, but the present disclosure is not limited thereto.

The light conversion particles 324 may include a first light conversion particle 324a and a second light conversion particle 324b.

The first light conversion particle 324a may be a red quantum dot, and the second light conversion particle 324b may be a green quantum dot. When blue light emitted from the light sources 310b is introduced to the color conversion layer 320e, the first light conversion particle 324a may emit red light having a wavelength of about 620 nm to about 680 nm by absorbing the blue light and shifting the wavelength of the blue light to the wavelength of the red light according to an energy change. When blue light emitted from the light sources 310b is introduced to the color conversion layer 320e, the second light conversion particle 324b may emit green light having a wavelength of about 500 nm to about 560 nm by absorbing the blue light and shifting the wavelength of the blue light to the wavelength of the green light according to an energy change.

The first light conversion particle 324a and the second light conversion particle 324b may be selected from a Group II-IV compound, a Group III-V compound, a Group IV-VI compound, a Group IV compound, a Group VI compound, and combinations thereof.

The first light conversion particle 324a and the second light conversion particle 324b may have a core/shell structure in which one quantum dot surrounds another quantum dot. The interface between a core and a shell may have a concentration gradient where the concentration of an element existing in the shell is decreased as approaching the center thereof.

The shape of the first light conversion particle 324a and the second light conversion particle 324b may be one generally used in the art, and is not particularly limited. In an exemplary embodiment, the shape of the first light conversion particle 324a and the second light conversion particle 324b may be one of a spherical, pyramid-shaped, multi-arms, or cubic nano particle, a nano tube, a nano wire, a nano fiber, or a nano plate-shaped particle.

In an exemplary embodiment of the present disclosure, since the first light conversion particle 324a and the second light conversion particle 324b have excellent color purity, white light having excellent light characteristics may be implemented. Specifically, in a process in which blue light emitted from each of the light sources 310b passes through the color conversion layer 320e, the blue light is converted into red light by the first light conversion particle 324a and is converted into green light by the second light conversion particle 324b. The blue light emitted from the light source 310b, the red light converted by the first light conversion particle 324a, and the green light converted by the second light conversion particle 324b are mixed with each other, so that white light having light characteristics can be implemented. The white light finally emitted from the color conversion layer 320e may be provided toward the display panel 100.

The color conversion layer 320e and the second layer 320b may be coupled to each other through a second interlayer CTL2 including an optically clear adhesive (OCA) as an adhesive material having light transmittance.

In an exemplary embodiment of the present disclosure, the reflective layer 320c, the first layer 320a, the second layer 320b, and the color conversion layer 320e may all constitute the first optical layer 320 in a state in which they are integrally laminated.

As described above, the first optical layer 320 includes the color conversion layer 320e, so that light having excellent characteristics (e.g., uniform white light) can be provided to the display panel 100. Accordingly, the quality of an image displayed on the display panel 100 can be improved.

In the backlight unit and the display device having the same in accordance with the present disclosure, each light source is inserted into a concave part of a first layer, so that the display device can be easily slimmed.

Further, in the backlight unit and the display device having the same in accordance with the present disclosure, light emitted from each light source is diffused and/or scattered by light diffusion particles of the first layer while being incident into the concave part, and then advances toward a second layer. The light incident into the second layer is guided by total reflection and then selectively emitted by optical patterns. Accordingly, a uniform light emission distribution can be obtained throughout all regions of the second layer, regardless of positions of light sources.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular exemplary embodiment may be used singly or in combination with features, characteristics, and/or elements described in connection with other exemplary embodiments unless otherwise specifically indicated. Accordingly, it will be understood by those of skill in the art that various changes in form and details may be made without departing from the spirit and scope of the present disclosure as set forth in the following claims.

What is claimed is:

1. A backlight unit comprising:
a light source array including at least one light source which emits light and a circuit board on which the light source is disposed; and
a first optical layer disposed on the light source array, wherein the first optical layer includes:
a first layer which defines at least one concave portion in a bottom of the first layer, the at least one concave portion being coupled to the light source;
a second layer disposed on the first layer, the second layer guiding light incident from the first layer in one direction;
a plurality of optical patterns disposed on an upper surface of the second layer, wherein the upper surface is opposite to the first layer with respect to the second layer, and the plurality of optical patterns is configured to selectively emit light passing through the second layer; and
a reflective layer disposed on the bottom of the first layer.

2. The backlight unit of claim 1, wherein the concave portion has a shape recessed toward a top of the first layer from the bottom of the first layer.

3. The backlight unit of claim 2, wherein the first layer has at least two different thicknesses depending on a region.

4. The backlight unit of claim 3, wherein the first layer includes at least one light diffusion particle that scatters light received from the light source.

5. The backlight unit of claim 1, wherein the second layer includes a transparent material.

6. The backlight unit of claim 5, wherein the plurality of optical patterns is integrally provided with the second layer.

7. The backlight unit of claim 6, wherein at least one region of the upper surface of the second layer includes an uneven surface.

8. The backlight unit of claim 7, wherein each of the plurality of optical patterns has a shape protruding toward an upper portion from the upper surface of the second layer.

9. The backlight unit of claim 7, wherein each of the plurality of optical patterns has a shape recessed toward a lower portion from the upper surface of the second layer.

10. The backlight unit of claim 5, wherein the light source is provided in plural, and a distance of the optical pattern from an adjacent optical pattern thereto decreases as the optical pattern becomes closer to a center point of two points on the upper surface of the second layer and overlapping two adjacent light sources, respectively, of the light sources.

11. The backlight unit of claim 10, wherein the optical pattern on the upper surface of the second layer has a size that increases as being closer to the center point.

12. The backlight unit of claim 1, wherein the reflective layer defines an opening portion corresponding to the concave portion.

13. The backlight unit of claim 12, wherein the opening portion is a through hole that penetrates at least one region of the reflective layer.

14. The backlight unit of claim 1, wherein the first optical layer further includes an interlayer disposed between the first layer and the second layer,
wherein the interlayer includes a pressure sensitive adhesive (PSA) or an optically clear adhesive (OCA).

15. The backlight unit of claim 14, wherein the reflective layer, the first layer, and the second layer are integrally laminated, to constitute the first optical layer.

16. The backlight unit of claim 1, wherein the first optical layer further includes a sub-layer disposed on the upper surface of the second layer and the plurality of optical patterns, the sub-layer diffusing light incident from the plurality of optical patterns.

17. The backlight unit of claim 16, wherein an adhesive layer is disposed between the second layer and the sub-layer.

18. The backlight unit of claim 1, wherein the first optical layer further includes a color conversion layer disposed on the second layer, the color conversion layer generating converted light by converting a color of light incident from the optical patterns.

19. The backlight unit of claim 1, further comprising a second optical layer disposed on the first optical layer, the second optical layer controlling an advancing direction of light incident from the first optical layer.

20. A display device comprising:
a display panel which displays an image; and
a backlight unit which provides light for displaying the image to the display panel,
wherein the backlight unit includes:
a light source array including at least one light source which emits light and a circuit board on which the light source is disposed;
a first optical layer disposed on the light source array; and
a second optical layer disposed on the first optical layer to control an advancing direction of light incident from the first optical layer,
wherein the first optical layer includes;
a first layer defining at least one concave portion in a bottom of the first layer, the at least one concave portion being coupled to the light source;
a second layer disposed on the first layer, the second layer guiding light incident from the first layer toward the display panel;
a plurality of optical patterns disposed on an upper surface of the second layer, wherein the upper surface is opposite to the first layer with respect to the second layer, and the plurality of optical patterns is configured to is selectively emit light passing through the second layer; and
a reflective layer disposed on the bottom of the first layer, the reflective layer defining an opening portion corresponding to the at least one concave portion.

* * * * *